US008717457B2

(12) United States Patent
Lin et al.

(10) Patent No.: US 8,717,457 B2
(45) Date of Patent: May 6, 2014

(54) ADAPTIVE SPECTRAL IMAGING FOR VIDEO CAPTURE

(75) Inventors: Andy Lai Lin, Parsippany, NJ (US); Francisco Imai, Mountain View, CA (US); Axel Becker-Lakus, San Jose, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 123 days.

(21) Appl. No.: 13/585,661

(22) Filed: Aug. 14, 2012

(65) Prior Publication Data

US 2014/0049662 A1 Feb. 20, 2014

(51) Int. Cl.
*H04N 5/228* (2006.01)
*H04N 9/64* (2006.01)

(52) U.S. Cl.
USPC .......................................... 348/222.1; 348/33

(58) Field of Classification Search
CPC ....... H04N 5/045; H04N 9/735; H04N 5/332; H04N 5/235
USPC .................. 348/33, 237, 222.1; 382/199, 166
See application file for complete search history.

(56) References Cited

U.S. PATENT DOCUMENTS

| | | | |
|---|---|---|---|
| 6,879,716 B1* | 4/2005 | Ishibashi ....................... | 382/166 |
| 7,554,586 B1 | 6/2009 | Imai et al. | |
| 2002/0012064 A1* | 1/2002 | Yamaguchi ................... | 348/362 |
| 2009/0027518 A1* | 1/2009 | Kita .......................... | 348/231.99 |
| 2009/0237533 A1* | 9/2009 | Onodera et al. ............. | 348/247 |
| 2010/0238319 A1* | 9/2010 | Ishibashi .................... | 348/229.1 |
| 2011/0019032 A1* | 1/2011 | Pinsky et al. ................. | 348/238 |
| 2011/0317043 A1* | 12/2011 | On ............................... | 348/241 |
| 2012/0127301 A1 | 5/2012 | Imai | |

OTHER PUBLICATIONS ("Multispectral video," Pattern Recognition, 2000. Proceedings. 15th International Conference on , vol. 3, no., pp. 186,189 vol. 3, 2000.*
Imai, et al., "Art-si.org art spectral imaging", Technical Report, Imaging at the National Gallery of Art, Dec. 12-13, 2002.
Hill, "The History of Multispectral Imaging at Aachen University of Technology", 2002.
Mohan, et al., "Programmable Wavelength Modulation for cameras and projectors", published at Eurographics, 2008.
Longoni, et al., "The transverse field detector (TFD): a novel color-sensitive CMOS device", IEEE Electron Device Letters 29, pp. 1306-1308, 2008.
Langfelder, et al., "Design and Realization of a Novel Pixel Sensor for Color Imaging Applications in CMOS 90 nm Technology", in Sensors and Microsystems, Lecture notes in Electrical Engineering, vol. 54, Part 3, 2010.

(Continued)

*Primary Examiner* — Sinh Tran
*Assistant Examiner* — Shahbaz Nazrul
(74) *Attorney, Agent, or Firm* — Fitzpatrick, Cella, Harper & Scinto

(57) ABSTRACT

A spectral capture parameter is adjusted for capturing successive frames of motion image data. Spectral content in a first region of a current frame is compared to spectral content in a counterpart region in a previous frame. It is determined whether the spectral content has changed by more than a threshold value, based on the comparison. Responsive to a determination that the spectral content has changed by more than the threshold value, the spectral capture parameter for the first region is adjusted, and the adjusted spectral capture parameter is applied to an imaging system for capture of a successive frame.

23 Claims, 15 Drawing Sheets

(56) References Cited

OTHER PUBLICATIONS http://en.wikipedia.org/wiki/Motion_estimation, last modified on Jul. 24, 2012.

http://en.wikipedia.org/wiki/Block-matching_algorithm, last modified on Sep. 10, 2011.

http://en.wikipedia.org/wiki/Lucas%E2%80%93Kanade_method, last modified on Jul. 18, 2012.

Lin, et al., "Efficient Spectral Imaging based on Imaging Systems with Scene Adaptation Using Tunable Color Pixels", Society for Imaging Science and Technology, 2011.

\* cited by examiner

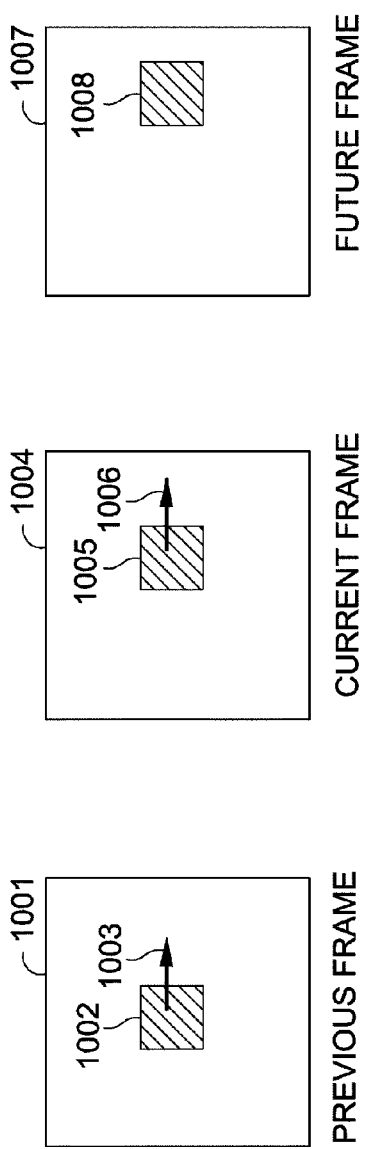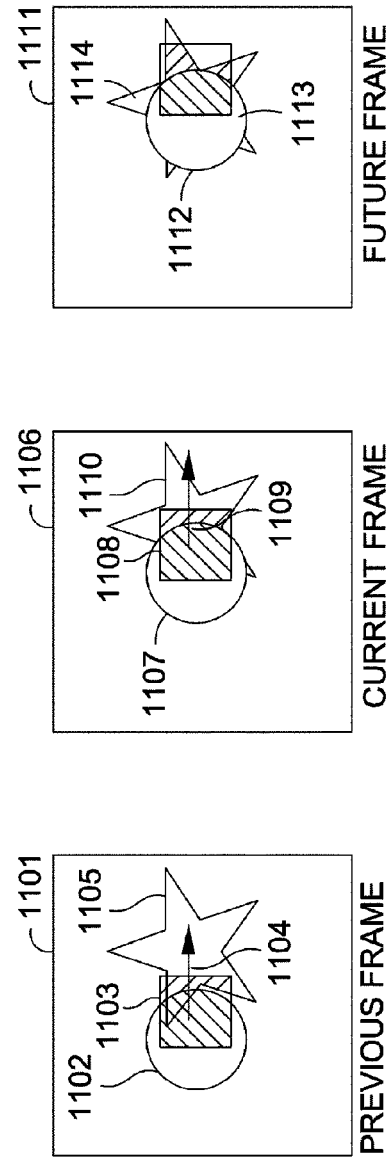

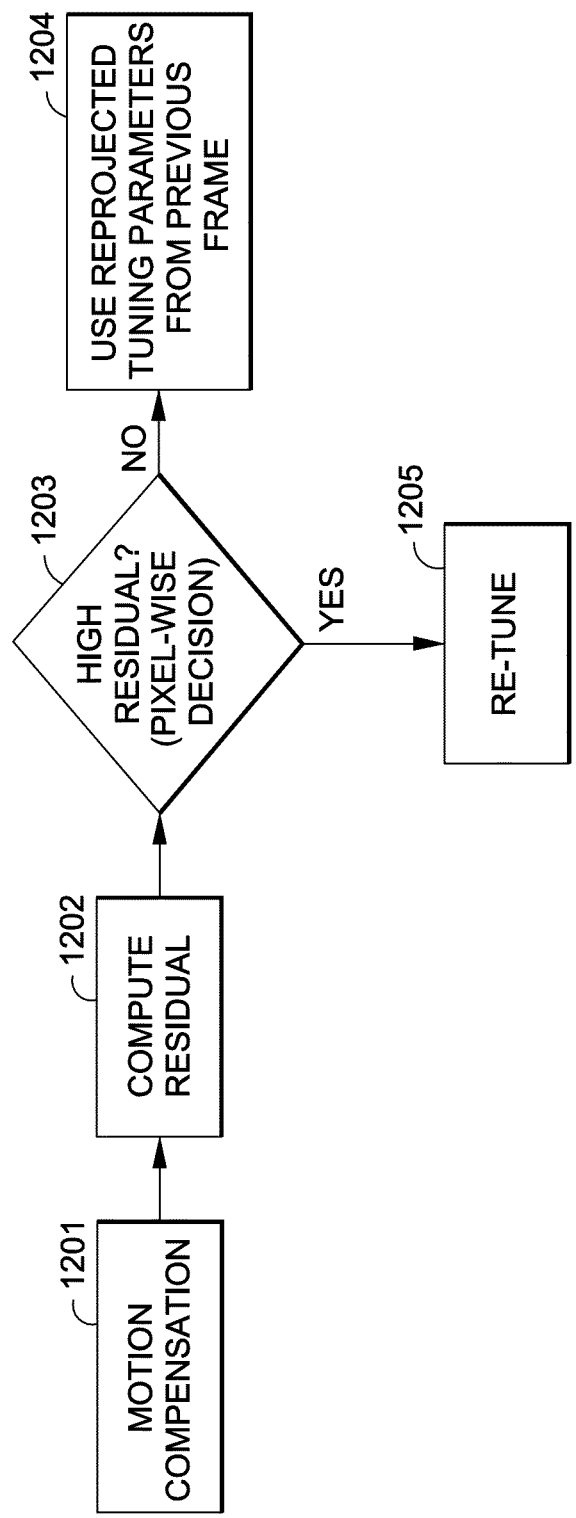

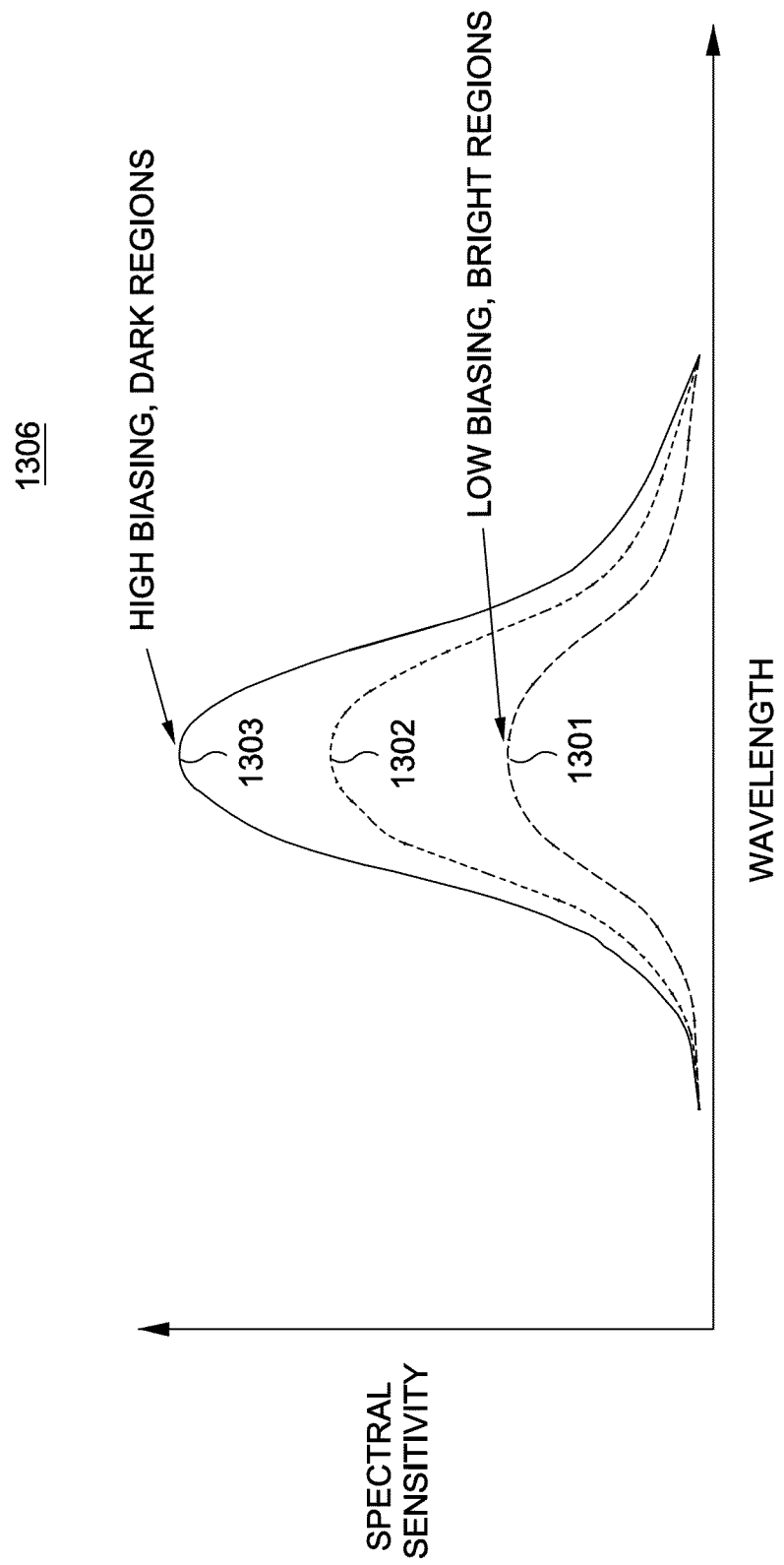

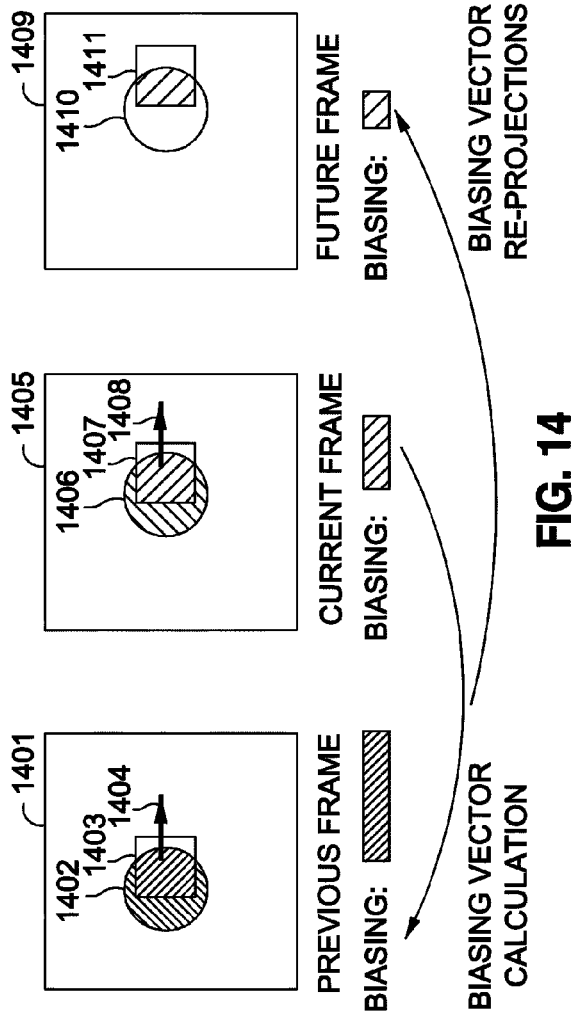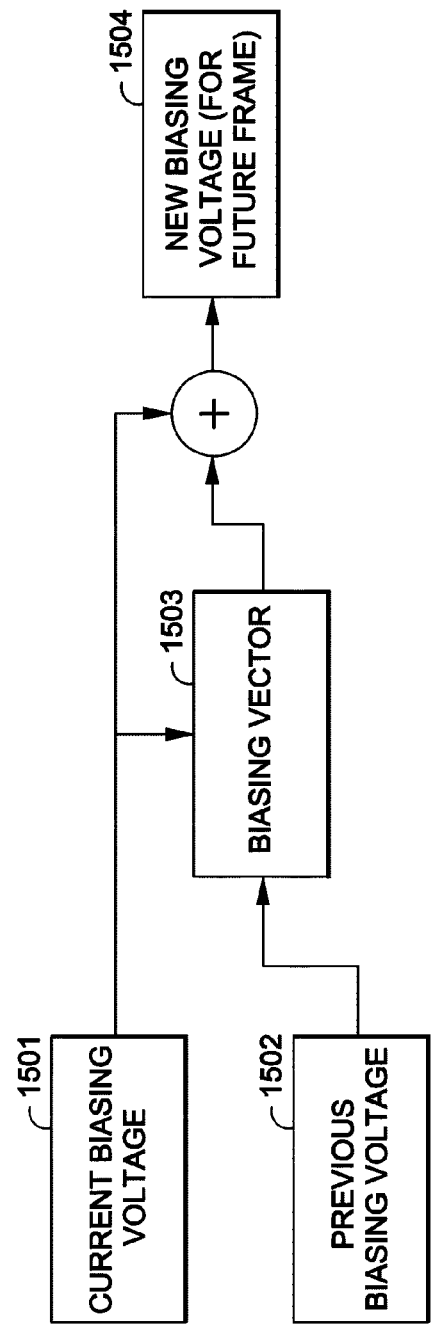

ADAPTIVE SPECTRAL IMAGING FOR VIDEO CAPTURE

FIELD

The present disclosure relates to spectral image capture, and more particularly relates to spectral image capture of motion video image data.

BACKGROUND

In the field of imaging, it is common to capture video data comprising a time-wise sequence of multiple images of a scene. For example, a video camera may continuously capture images of a scene on a frame-by-frame basis. The video data can then be played back, edited, transmitted, or otherwise processed.

SUMMARY

Recently, imaging assemblies have been developed which have a spectral response tunable in accordance with a spectral capture parameter. In one example, there are imaging assemblies where the image sensor itself has a tunable spectral response. For instance, there is an image sensor described in "The Transverse Field Detector: A Novel Color Sensitive CMOS Device", Zaraga, IEEE Electron Device Letters 29, 1306-1308 (2008), "Design and Realization of a Novel Pixel Sensor for Color Imaging Applications in CMOS 90 NM Technology", Langfelder, Electronics and Information Department, Politecnico di Milano, via Ponzio 34/5 20133, Milano, Italy, 143-146 (2010), and U.S. Patent Publication No. 2010/0044822, the contents of which are incorporated herein by reference. These documents describe a transverse field detector (TFD) which has a tunable spectral responsivity that can be adjusted by application of bias voltages to control electrodes. By applying asymmetric biasing, each of the electrodes of the TFD pixel can receive a different bias voltage, thereby providing for channels that can each be tuned to different spectral sensitivities. By selectively adjusting the sensitivities (by adjusting the voltages of control electrodes) for each region of the scene projection onto the image sensor plane, it is possible to come with an image acquisition that capture spectral bands in the wavelength that have more significant information and minimize the capture of noisy channels where information is not present. Thus, for example, in a region of the image which includes a red apple, the sensor might be tuned so as to capture more red color and less blue color.

In the second example of imaging assemblies which have a tunable spectral response, there are imaging assemblies where the image sensor is preceded by a color filter array (CFA), and it is the color filter array that has a tunable spectral response. In the first example described above, because the image sensor itself has a tunable spectral response, it might be customary to omit a preceding color filter array, since the inclusion of any filter necessarily would decrease the signal-to-noise ratio by filtering the amount of light incident on the image sensor. In contrast, in this second example, the spectral responsivity of the image sensor is not necessarily tunable, but the spectral responsivity of a preceding color filter array is. For instance, there is a tunable color filter array described in U.S. Pat. No. 6,466,961 by Miller, "Methods for Adaptive Spectral, Spatial and Temporal Sensing for Imaging Applications", the content of which is incorporated herein by reference. This document describes an imaging assembly comprising a color filter array which precedes an image sensor whose spectral responsivity is constant, but in which the color filter array itself has a tunable spectral responsivity that can be adjusted electronically. Each array element thus filters light incident on corresponding pixels of the image sensor, and the image sensor thereafter outputs signals. In the case of a color filter array with temporal sensing, the channels for each pixel may be output sequentially, one after the other. In the case of a color filter array with spatial sensing, the channels for each pixel may be output simultaneously requiring demosaicing.

The inventors herein have determined that spectral video is a next step in spectral imaging, in which there is capture of a succession of spectral image frames. However, tuning the spectral response of the sensors for every region in a single frame of the video is not only computationally very expensive and therefore impractical, but in fact may not even be necessary because of redundancies between sequential frames.

The foregoing situation is addressed by dividing each frame into regions, and tuning the sensors for a region responsive to a determination that the spectral content in the region changes between frames by more than a threshold value.

Thus, in an example embodiment described herein considering a stationary camera in which video frames tend to be highly correlated with neighboring frames, a spectral capture parameter is adjusted for capturing successive frames of motion image data in a spectral imaging system. The spectral imaging system has a spectral response tunable in accordance with a spectral capture parameter to capture multi-spectral or multi-channel image data, and includes an image sensor. Spectral content in a first region of a current frame is compared to spectral content in a counterpart region in a previous frame having a same relative position as the first region. Based on the comparison of the spectral content in the first region and that of the counterpart region, there is a determination of whether the spectral content has or has not changed by more than a threshold value related to the spectral error. Responsive to a determination that the spectral content has changed by more than the spectral error threshold value, the spectral capture parameter for the first region is adjusted based on the spectral content of the first region, and the adjusted spectral capture parameter is applied to the imaging system for capture of a successive frame.

By dividing each frame into regions, and tuning the system for the region responsive to a determination that the spectral content in the region changes between frames by more than the spectral error threshold value, it is ordinarily possible to significantly reduce the amount of computation required for tuning the image system for capture of spectral video.

According to an additional aspect, responsive to a determination that the spectral content has not changed by more than the spectral error threshold value, the spectral capture parameter is maintained unchanged from that for the counterpart region, and the unchanged spectral capture parameter is applied to the imaging system for capture of the successive frame.

According to another aspect related to non-stationary cameras, motion is estimated between the previous frame and the current frame, and a location of the first region in a successive frame is predicted based on location of the counterpart region in the previous frame and based on the motion estimation. The spectral capture parameter is adjusted at the predicted location of the first region in a case where the estimated motion exceeds the spectral error threshold value.

According to still another aspect considering when parts of a block are moving and other parts are stationary, there is a calculation of the residual between a block of the current frame and the motion compensated block from the previous frame. If the residual exceeds a predetermined threshold, a future frame is re-tuned based on the original motion-projected regions of the current frame, or the future frame is retuned based on a pixel from the current frame.

According to still another aspect, after a predetermined number of frames have been captured, a refresh frame is calculated in which the tuning parameters for the frame are re-tuned based only on data captured in the refresh frame. Put another way, after a set-number of frames, there is an intra-coded frame which forces the entire frame to re-tune system parameters based on the current frame, in order to compensate for inaccuracy which might add up throughout a large number of frames.

According to yet another aspect considering a high-dynamic range (HDR) scene, a biasing term is computed for the current and previous frames. The computed biasing terms are used to find the difference in the biasing term between the previous motion-compensated pixels. The biasing terms are used to produce higher sensitivity in darker regions and lower sensitivity in brighter regions.

This brief summary has been provided so that the nature of this disclosure may be understood quickly. A more complete understanding can be obtained by reference to the following detailed description and to the attached drawings.

BRIEF DESCRIPTION OF THE DRAWINGS

FIG. 10 is a view for explaining motion vector prediction according to an example embodiment.

FIG. 11 is a view for explaining high residual situations according to an example embodiment.

FIG. 12 is a flowchart for explaining high residual correction according to an example embodiment.

FIG. 13 is a view for explaining biasing for spectral sensitivity according to an example embodiment.

FIG. 14 is another view for explaining biasing according to an example embodiment.

FIG. 15 is a flow diagram for explaining biasing according to an example embodiment.

DETAILED DESCRIPTION

In the following example embodiments, there is described a multi-spectral digital camera which may be a digital camera with video capturing capabilities. It is understood, however, that the following description encompasses arbitrary arrangements which can incorporate or utilize imaging assemblies having a spectral response, for instance, a data processing apparatus having an image sensing function (e.g., a personal computer) or a portable terminal having an image sensing function (e.g., a mobile telephone).

Figure 1A:
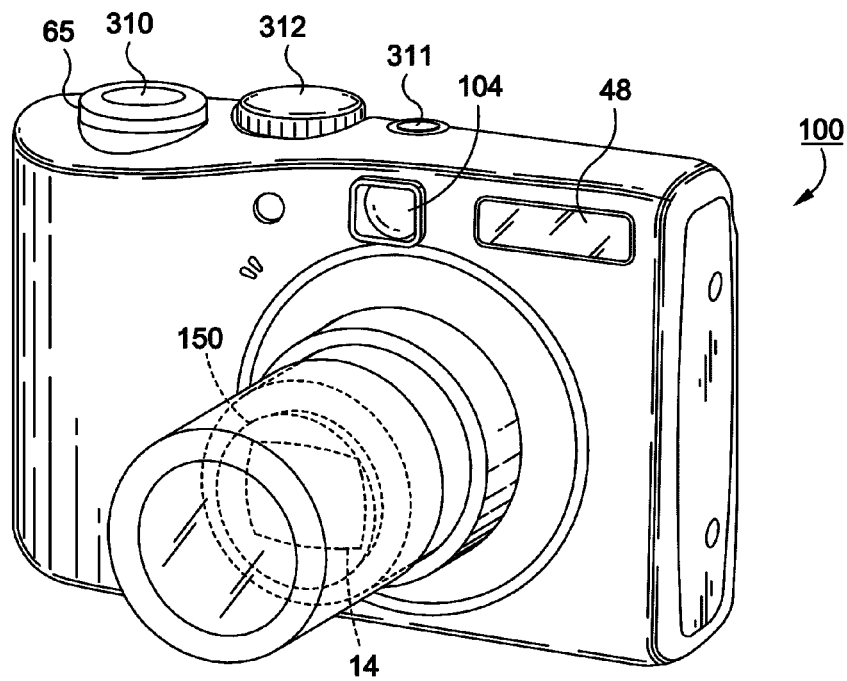
FIGS. 1A and 1B are views depicting an external appearance of an image capture device according to an example embodiment.
Figure 1B:
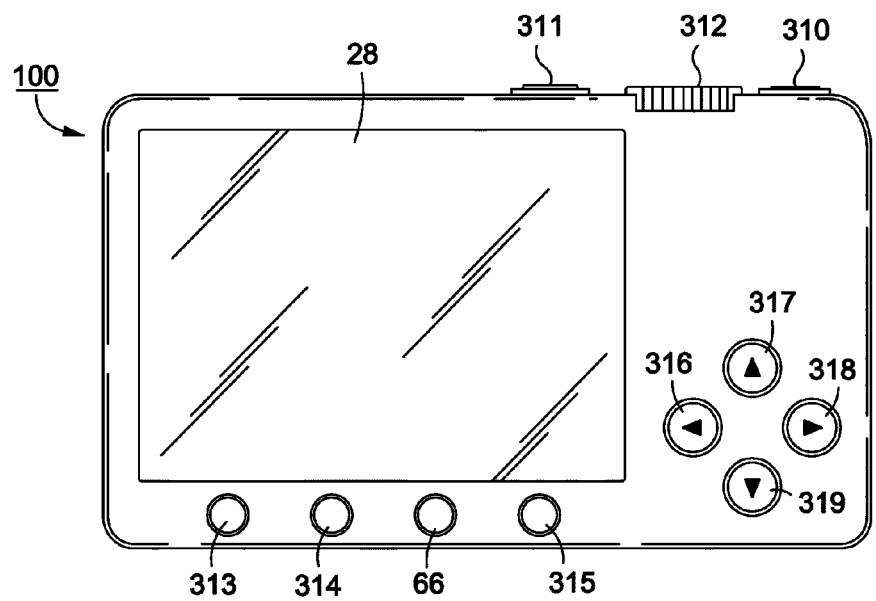

FIGS. 1A and 1B are views showing an example of an external appearance of an image capture device 100 according to an example embodiment. Specifically, in this embodiment, digital camera 100 is a digital camera with video capturing capabilities. Note that in these figures, some components are omitted for conciseness. A user operates buttons and switches 310 to 319 for turning ON/OFF the power of the digital camera 100, for setting, changing or confirming the shooting parameters, for confirming the status of the camera, and for confirming shot images.

Optical finder 104 is a viewfinder, through which a user can view a scene to be captured. In this embodiment optical finder 104 is separate from image display unit 28, but in some embodiments image display unit 28 may also function as a viewfinder.

Flash (flash emission device) 48 is for emitting auxiliary light to illuminate a scene to be captured, if necessary.

Image sensor 14 that is inside camera 100 is an image sensor which converts an optical image into an electrical signal. In some embodiments, image sensor 14 may be tunable in accordance with a capture parameter. Image sensor 14 will be described more fully below with respect to FIG. 2A.

The power button 311 is provided to start or stop the digital camera 100, or to turn ON/OFF the main power of the digital camera 100. The menu button 313 is provided to display the setting menu such as shooting parameters and operation modes of the digital camera 100, and to display the status of the digital camera 100. The menu includes selectable items or items whose values are variable.

A delete button 315 is pressed for deleting an image displayed on a playback mode or a shot-image confirmation screen. In the present embodiment, the shot-image confirmation screen (a so-called quick review screen) is provided to display a shot image on the image display unit 28 immediately after shooting for confirming the shot result. Furthermore, the present embodiment is constructed in a way that the shot-image confirmation screen is displayed as long as a user keeps pressing the shutter button 310 after the user instructs shooting by shutter button depression.

An enter button 314 is pressed for selecting a mode or an item. When the enter button 314 is pressed, the system controller 50 in FIG. 2A sets the mode or item selected at this time. The display ON/OFF button 66 is used for selecting displaying or non-displaying of photograph information regarding the shot image, and for switching the image display unit 28 to be functioned as an electronic view finder.

A left button 316, a right button 318, an up button 317, and a down button 319 may be used for the following purposes, for instance, changing an option (e.g., items, images) selected from plural options, changing an index position that specifies a selected option, and increasing or decreasing numeric values (e.g., correction value, date and time).

Half-stroke of the shutter button 310 instructs the system controller 50 to start, for instance, AF processing, AE processing, AWB processing, EF processing or the like. Full-stroke of the shutter button 310 instructs the system controller 50 to perform shooting.

The zoom operation unit 65 is operated by a user for changing the angle of view (zooming magnification or shooting magnification).

A recording/playback selection switch 312 is used for switching a recording mode to a playback mode, or switching a playback mode to a recording mode. Note, in place of the above-described operation system, a dial switch may be adopted or other operation systems may be adopted.

Imaging system 150 is a spectral imaging system which has a spectral response tunable in accordance with a spectral capture parameter to capture multi-spectral image data, and which includes image sensor 14.

Figure 1C:
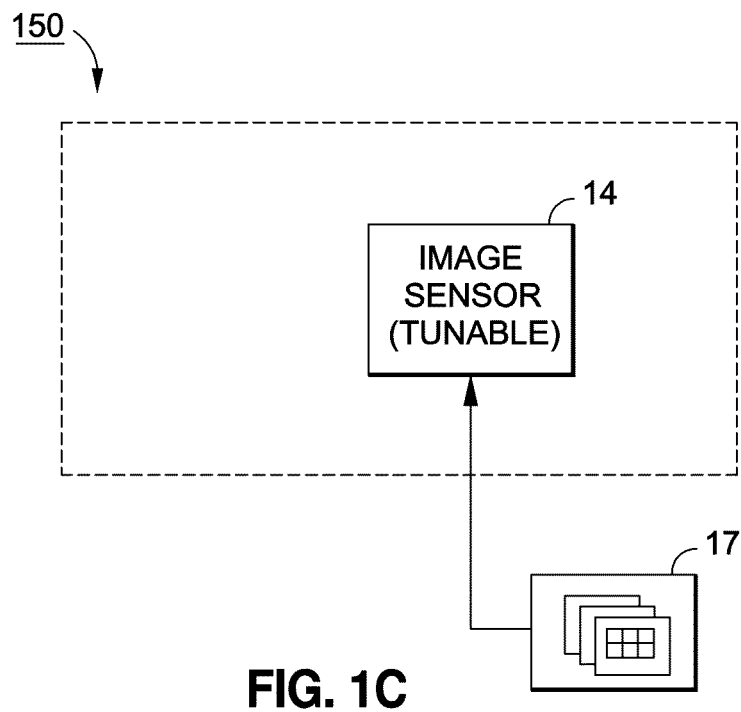
FIGS. 1C and 1D are views for explaining an imaging system according to example embodiments.

In one example shown in FIG. 1C, imaging system 150 includes a tunable image sensor 14. Put another way, image sensor 14 has tunable spectral sensitivities, as described, for example, in U.S. application Ser. No. 12/949,592, filed Nov. 18, 2010, entitled "Adaptive Spectral Imaging by Using an Imaging Assembly with Tunable Spectral Sensitivities", by Francisco Imai, the contents of which are incorporated by reference herein. In such an embodiment, image sensor 14 is a multi-spectral image sensor which has a spectral response which is tunable in accordance with a capture parameter 17.

Figure 1D:
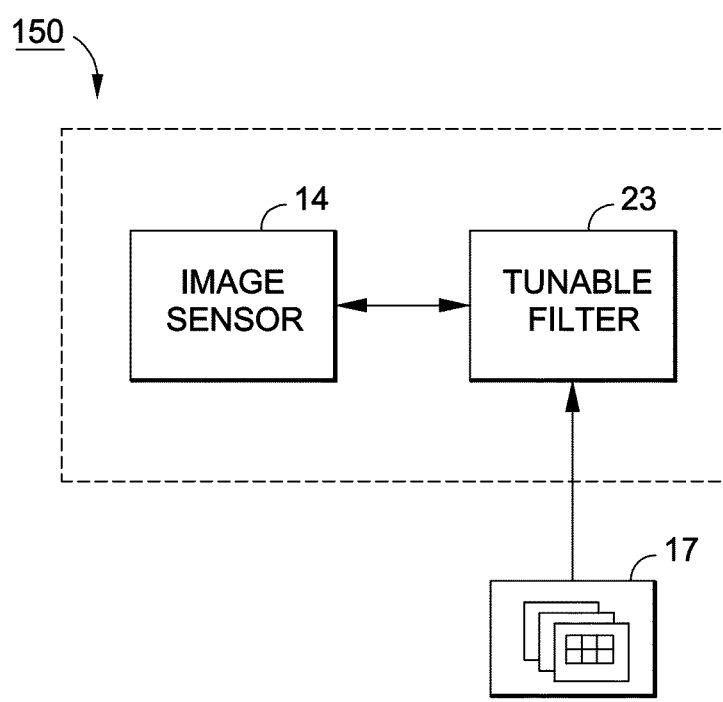

In another example embodiment shown in FIG. 1D, imaging system 150 may include an image sensor 14 which might not itself be tunable, but which is instead coupled with a preceding color filter array 23 that has a tunable spectral response. Thus, the spectral responsivity of the image sensor 14 is not necessarily tunable, but the spectral responsivity of the preceding color filter array 23 is tunable in accordance with the capture parameter 17.

Figure 2A:
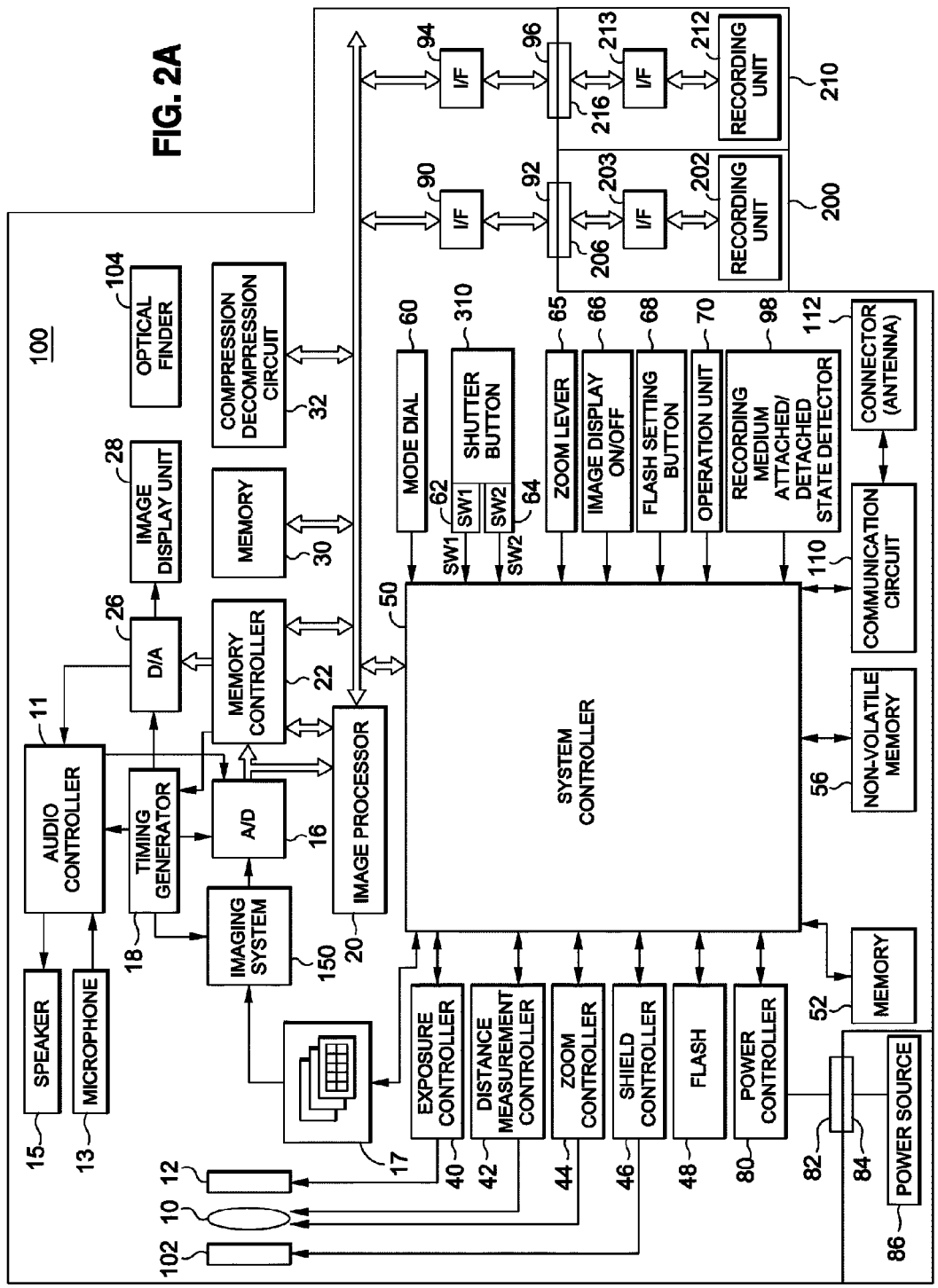
FIGS. 2A and 2B are detailed block diagrams for explaining the internal architecture of the image capture device shown in FIG. 1 according to an example embodiment.

FIG. 2A is a block diagram showing an example of the arrangement of the multi-spectral digital camera 100 as an image capture device according to this embodiment. Referring to FIG. 2, reference numeral 10 denotes an imaging lens; 12, a shutter having an aperture function; and 14, an image sensor which converts an optical image into an electrical signal. Reference numeral 16 denotes an A/D converter which converts an analog signal into a digital signal. The A/D converter 16 is used when an analog signal output from the image sensor 14 is converted into a digital signal and when an analog signal output from an audio controller 11 is converted into a digital signal. Reference numeral 102 denotes a shield, or barrier, which covers the image sensor including the lens 10 of the digital camera 100 to prevent an image capturing system including the lens 10, shutter 12, and image sensor 14 from being contaminated or damaged.

The optical system 10 may be of a zoom lens, thereby providing an optical zoom function. The optical zoom function is realized by driving a magnification-variable lens of the optical system 10 using a driving mechanism of the optical system 10 or a driving mechanism provided on the main unit of the digital camera 100.

A light beam (light beam incident upon the angle of view of the lens) from an object in a scene that goes through the optical system (image sensing lens) 10 passes through an opening of a shutter 12 having a diaphragm function, and forms an optical image of the object on the image sensing surface of the image sensor 14. The image sensor 14 converts the optical image to analog image signals and outputs the signals to an A/D converter 16. The A/D converter 16 converts the analog image signals to digital image signals (image data). The image sensor 14 and the A/D converter 16 are controlled by clock signals and control signals provided by a timing generator 18. The timing generator 18 is controlled by a memory controller 22 and a system controller 50.

In the embodiment shown in FIG. 2A, imaging system 150 is tunable in accordance with a capture parameter 17. The precise nature of the spectral responsivity of imaging system 150 is controlled via capture parameter 17. In this embodiment, capture parameter 17 may be comprised of multiple spatial masks, with one mask each for each channel of information output by imaging system 150. Each spatial mask comprises an array of control parameters corresponding to pixels or regions of pixels in imaging system 150. In this regard, imaging system 150 may be constructed such that image sensor 14 comprises a transverse field detector (TFD) sensor mentioned hereinabove. In such a case, the spatial masks may correspond to voltage biases applied to control electrodes of the TFD sensor. The spectral responsivity of each pixel, or each region of plural pixels, is thus tunable individually and independently of other pixels or regions of pixels.

In one example embodiment, imaging system 150 gathers high-resolution spectral data, and outputs, for example, five or more channels of color information, including a red-like channel, a green-yellow-like channel, a green-like channel, a blue-green-like channel, and a blue-like channel. In such an example, where imaging system 150 outputs five or more channels, capture parameter 17 includes a spatial mask DR for the red-like channel of information, a spatial mask DGY for the green-yellow-like channel of information, a spatial mask DG for the green-like channel of information, a spatial mask DBG for the blue-green-like channel of information and a spatial mask DB for the blue-like channel of information.

Reference numeral 18 denotes a timing generator, which supplies clock signals and control signals to the image sensor 14, the audio controller 11, the A/D converter 16, and a D/A converter 26. The timing generator 18 is controlled by a memory controller 22 and system controller 50. Reference numeral 20 denotes an image processor, which applies resize processing such as predetermined interpolation and reduction, and color conversion processing to data from the A/D converter 16 or that from the memory controller 22. The image processor 20 executes predetermined arithmetic processing using the captured image data, and the system controller 50 executes exposure control and ranging control based on the obtained arithmetic result.

As a result, TTL (through-the-lens) AF (auto focus) processing, AE (auto exposure) processing, and EF (flash pre-emission) processing are executed. The image processor 20 further executes predetermined arithmetic processing using the captured image data, and also executes TTL AWB (auto white balance) processing based on the obtained arithmetic result. It is understood that in other embodiments, optical finder 104 may be used in combination with the TTL arrangement, or in substitution therefor.

Output data from the A/D converter 16 is written in a memory 30 via the image processor 20 and memory controller 22 or directly via the memory controller 22. The memory 30 stores image data which is captured by the image sensor 14 and is converted into digital data by the A/D converter 16, and image data to be displayed on an image display unit 28. The image display unit 28 may be a liquid crystal screen. Note that the memory 30 is also used to store audio data recorded via a microphone 13, still images, movies, and file headers upon forming image files. Therefore, the memory 30 has a storage capacity large enough to store a predetermined number of still image data, and movie data and audio data for a predetermined period of time.

A compression/decompression unit 32 compresses or decompresses image data by adaptive discrete cosine transform (ADCT) or the like. The compression/decompression unit 32 loads captured image data stored in the memory 30 in response to pressing of the shutter 310 as a trigger, executes the compression processing, and writes the processed data in the memory 30. Also, the compression/decompression unit 32 applies decompression processing to compressed image data loaded from a detachable recording unit 202 or 212, as described below, and writes the processed data in the memory 30. Likewise, image data written in the memory 30 by the compression/decompression unit 32 is converted into a file by the system controller 50, and that file is recorded in nonvolatile memory 56 and/or the recording unit 202 or 212, as also described below.

The memory 30 also serves as an image display memory (video memory). Reference numeral 26 denotes a D/A converter, which converts image display data stored in the memory 30 into an analog signal, and supplies that analog signal to the image display unit 28. Reference numeral 28 denotes an image display unit, which makes display according to the analog signal from the D/A converter 26 on the liquid crystal screen 28 of an LCD display. In this manner, image data to be displayed written in the memory 30 is displayed by the image display unit 28 via the D/A converter 26.

The exposure controller 40 controls the shutter 12 having a diaphragm function based on the data supplied from the system controller 50. The exposure controller 40 may also have a flash exposure compensation function by linking up with flash (flash emission device) 48. The flash 48 has an AF auxiliary light projection function and a flash exposure compensation function.

The distance measurement controller 42 controls a focusing lens of the optical system 10 based on the data supplied from the system controller 50. A zoom controller 44 controls zooming of the optical system 10. A shield controller 46 controls the operation of a shield (barrier) 102 to protect the optical system 10.

Reference numeral 13 denotes a microphone. An audio signal output from the microphone 13 is supplied to the A/D converter 16 via the audio controller 11 which includes an amplifier and the like, is converted into a digital signal by the A/D converter 16, and is then stored in the memory 30 by the memory controller 22. On the other hand, audio data is loaded from the memory 30, and is converted into an analog signal by the D/A converter 26. The audio controller 11 drives a speaker 15 according to this analog signal, thus outputting a sound.

A nonvolatile memory 56 is an electrically erasable and recordable memory, and uses, for example, an EEPROM. The nonvolatile memory 56 stores constants, computer-executable programs, and the like for operation of system controller 50. Note that the programs include those for execution of various flowcharts.

Figure 2B:
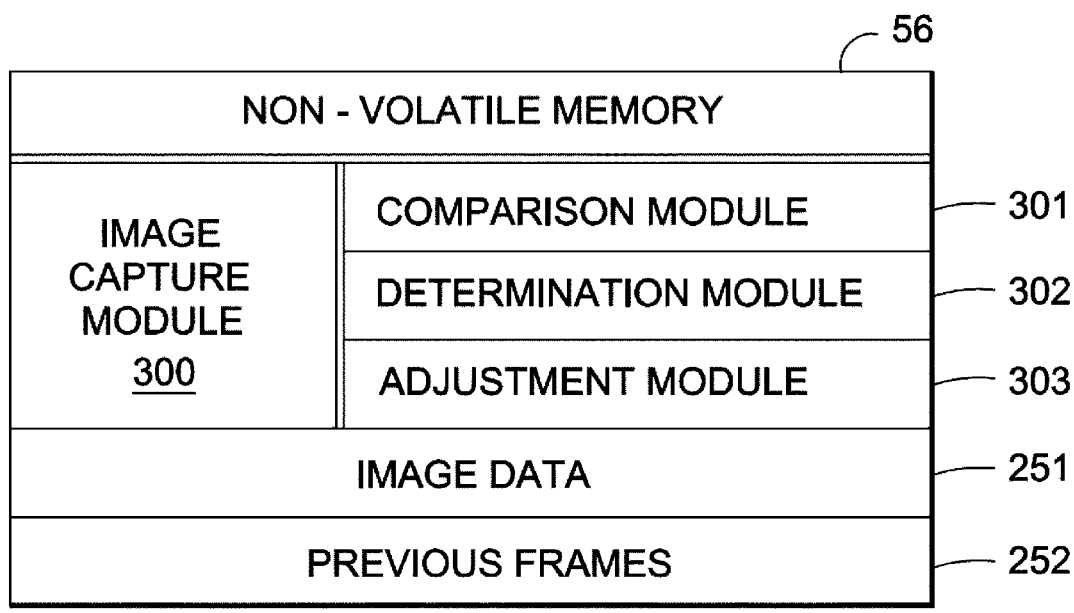

In particular, as shown in FIG. 2B, non-volatile memory 56 is an example of a non-transitory computer-readable memory medium, having retrievably stored thereon image capture module 300 as described herein. According to this example embodiment, the image capture module 300 includes at least comparison module 301 for comparing spectral content in a first region of a current frame to spectral content in a counterpart region in a previous frame, and a determination module 302 for determining whether the spectral content has changed by more than a threshold value, based on the comparison of the spectral content in the first region and that of the counterpart region. Image capture module 300 further includes an adjustment module 303 for, responsive to a determination that the spectral content has changed by more than the threshold value, adjusting the spectral capture parameter for the first region based on the spectral content of the first region, and applying the adjusted spectral capture parameter to the imaging system (e.g., imaging system 150) for capture of a successive frame. These modules will be discussed in more detail below with respect to FIG. 3.

Additionally, as shown in FIG. 2B, non-volatile memory 56 also includes image data 251, which includes image data from a scene. Non-volatile memory 56 further stores previous frames 252. Each of these elements will be described more fully below.

Reference numeral 50 denotes a system controller, which controls the entire digital camera 100. The system controller 50 executes programs recorded in the aforementioned non-volatile memory 56 to implement respective processes to be described later of this embodiment. Reference numeral 52 denotes a system memory which comprises a RAM. On the system memory 52, constants and variables required to operate system controller 50, programs read out from the nonvolatile memory 56, and the like are mapped.

A mode selection switch 60, shutter switch 310, and operation unit 70 form operation means used to input various operation instructions to the system controller 50.

The mode selection switch 60 includes the imaging/playback selection switch, and is used to switch the operation mode of the system controller 50 to one of a still image recording mode, movie recording mode, playback mode, and the like.

The shutter switch 62 is turned on in the middle of operation (half stroke) of the shutter button 310 arranged on the digital camera 100, and generates a first shutter switch signal SW1. Also, the shutter switch 64 is turned on upon completion of operation (full stroke) of the shutter button 310, and generates a second shutter switch signal SW2. The system controller 50 starts the operations of the AF (auto focus) processing, AE (auto exposure) processing, AWB (auto white balance) processing, EF (flash pre-emission) processing, and the like in response to the first shutter switch signal SW1. Also, in response to the second shutter switch signal SW2, the system controller 50 starts a series of processing (shooting) including the following: processing to read image signals from the image sensor 14, convert the image signals into image data by the A/D converter 16, process the image data by the image processor 20, and write the data in the memory 30 through the memory controller 22; and processing to read the image data from the memory 30, compress the image data by the compression/decompression circuit 32, and write the compressed image data in non-volatile memory 56, and/or in recording medium 200 or 210.

A zoom operation unit 65 is an operation unit operated by a user for changing the angle of view (zooming magnification or shooting magnification). The operation unit 65 can be configured with, e.g., a slide-type or lever-type operation member, and a switch or a sensor for detecting the operation of the member.

The image display ON/OFF switch 66 sets ON/OFF of the image display unit 28. In shooting an image with the optical finder 104, the display of the image display unit 28 configured with a TFT, an LCD or the like may be turned off to cut the power supply for the purpose of power saving.

The flash setting button 68 sets and changes the flash operation mode. In this embodiment, the settable modes include: auto, flash-on, red-eye reduction auto, and flash-on (red-eye reduction). In the auto mode, flash is automatically emitted in accordance with the lightness of an object. In the flash-on mode, flash is always emitted whenever shooting is performed. In the red-eye reduction auto mode, flash is automatically emitted in accordance with lightness of an object, and in case of flash emission the red-eye reduction lamp is always emitted whenever shooting is performed. In the flash-on (red-eye reduction) mode, the red-eye reduction lamp and flash are always emitted.

The operation unit 70 comprises various buttons, touch panels and so on. More specifically, the operation unit 70 includes a menu button, a set button, a macro selection button, a multi-image reproduction/repaging button, a single-shot/serial shot/self-timer selection button, a forward (+) menu selection button, a backward (−) menu selection button, and the like. Furthermore, the operation unit 70 may include a forward (+) reproduction image search button, a backward (−) reproduction image search button, an image shooting quality selection button, an exposure compensation button, a date/time set button, a compression mode switch and the like.

The compression mode switch is provided for setting or selecting a compression rate in JPEG (Joint Photographic Expert Group) compression, recording in a RAW mode and the like. In the RAW mode, analog image signals outputted by the image sensing device are digitalized (RAW data) as is and recorded.

Note in the present embodiment, RAW data includes not only the data obtained by performing A/D conversion on the photoelectrically converted data from the image sensing device, but also the data obtained by performing lossless compression on A/D converted data. Moreover, RAW data indicates data maintaining output information from the image sensing device without a loss. For instance, RAW data is A/D converted analog image signals which have not been subjected to white balance processing, color separation processing for separating luminance signals from color signals, or color interpolation processing. Furthermore, RAW data is not limited to digitalized data, but may be of analog image signals obtained from the image sensing device.

According to the present embodiment, the JPEG compression mode includes, e.g., a normal mode and a fine mode. A user of the digital camera 100 can select the normal mode in a case of placing a high value on the data size of a shot image, and can select the fine mode in a case of placing a high value on the quality of a shot image.

In the JPEG compression mode, the compression/decompression circuit 32 reads image data written in the memory 30 to perform compression at a set compression rate, and records the compressed data in, e.g., the recording medium 200.

In the RAW mode, analog image signals are read in units of line in accordance with the pixel arrangement of the color filter of the image sensor 14, and image data written in the memory 30 through the A/D converter 16 and the memory controller 22 is recorded in non-volatile memory 56, and/or in recording medium 200 or 210.

The digital camera 100 according to the present embodiment has a plural-image shooting mode, where plural image data can be recorded in response to a single shooting instruction by a user. Image data recording in this mode includes image data recording typified by an auto bracket mode, where shooting parameters such as white balance and exposure are changed step by step. It also includes recording of image data having different post-shooting image processing contents, for instance, recording of plural image data having different data forms such as recording in a JPEG form or a RAW form, recording of image data having the same form but different compression rates, and recording of image data on which predetermined image processing has been performed and has not been performed.

A power controller 80 comprises a power detection circuit, a DC-DC converter, a switch circuit to select the block to be energized, and the like. The power controller 80 detects the existence/absence of a power source, the type of the power source, and a remaining battery power level, controls the DC-DC converter based on the results of detection and an instruction from the system controller 50, and supplies a necessary voltage to the respective blocks for a necessary period. A power source 86 is a primary battery such as an alkaline battery or a lithium battery, a secondary battery such as an NiCd battery, an NiMH battery or an Li battery, an AC adapter, or the like. The main unit of the digital camera 100 and the power source 86 are connected by connectors 82 and 84 respectively comprised therein.

The recording media 200 and 210 comprise: recording units 202 and 212 that are configured with semiconductor memories, magnetic disks and the like, interfaces 203 and 213 for communication with the digital camera 100, and connectors 206 and 216. The recording media 200 and 210 are connected to the digital camera 100 through connectors 206 and 216 of the media and connectors 92 and 96 of the digital camera 100. To the connectors 92 and 96, interfaces 90 and 94 are connected. The attached/detached state of the recording media 200 and 210 is detected by a recording medium attached/detached state detector 98.

Note that although the digital camera 100 according to the present embodiment comprises two systems of interfaces and connectors for connecting the recording media, a single or plural arbitrary numbers of interfaces and connectors may be provided for connecting a recording medium. Further, interfaces and connectors pursuant to different standards may be provided for each system.

For the interfaces 90 and 94 as well as the connectors 92 and 96, cards in conformity with a standard, e.g., PCMCIA cards, compact flash (CF) (registered trademark) cards and the like, may be used. In this case, connection utilizing various communication cards can realize mutual transfer/reception of image data and control data attached to the image data between the digital camera and other peripheral devices such as computers and printers. The communication cards include, for instance, a LAN card, a modem card, a USB card, an IEEE 1394 card, a P1284 card, an SCSI card, and a communication card for PHS or the like.

The optical finder 104 is configured with, e.g., a TTL finder, which forms an image from the light beam that has gone through the lens 10 utilizing prisms and mirrors. By utilizing the optical finder 104, it is possible to shoot an image without utilizing an electronic view finder function of the image display unit 28. The optical finder 104 includes indicators, which constitute part of image display unit 28, for indicating, e.g., a focus state, a camera shake warning, a flash charge state, a shutter speed, an f-stop value, and exposure compensation.

A communication circuit 110 provides various communication functions such as USB, IEEE 1394, P1284, SCSI, modem, LAN, RS232C, and wireless communication. To the communication circuit 110, a connector 112 can be connected for connecting the digital camera 100 to other devices, or an antenna can be provided for wireless communication.

A real-time clock (RTC, not shown) may be provided to measure date and time. The RTC holds an internal power supply unit independently of the power supply controller 80, and continues time measurement even when the power supply unit 86 is OFF. The system controller 50 sets a system timer using a date and time obtained from the RTC at the time of activation, and executes timer control.

Figure 3:
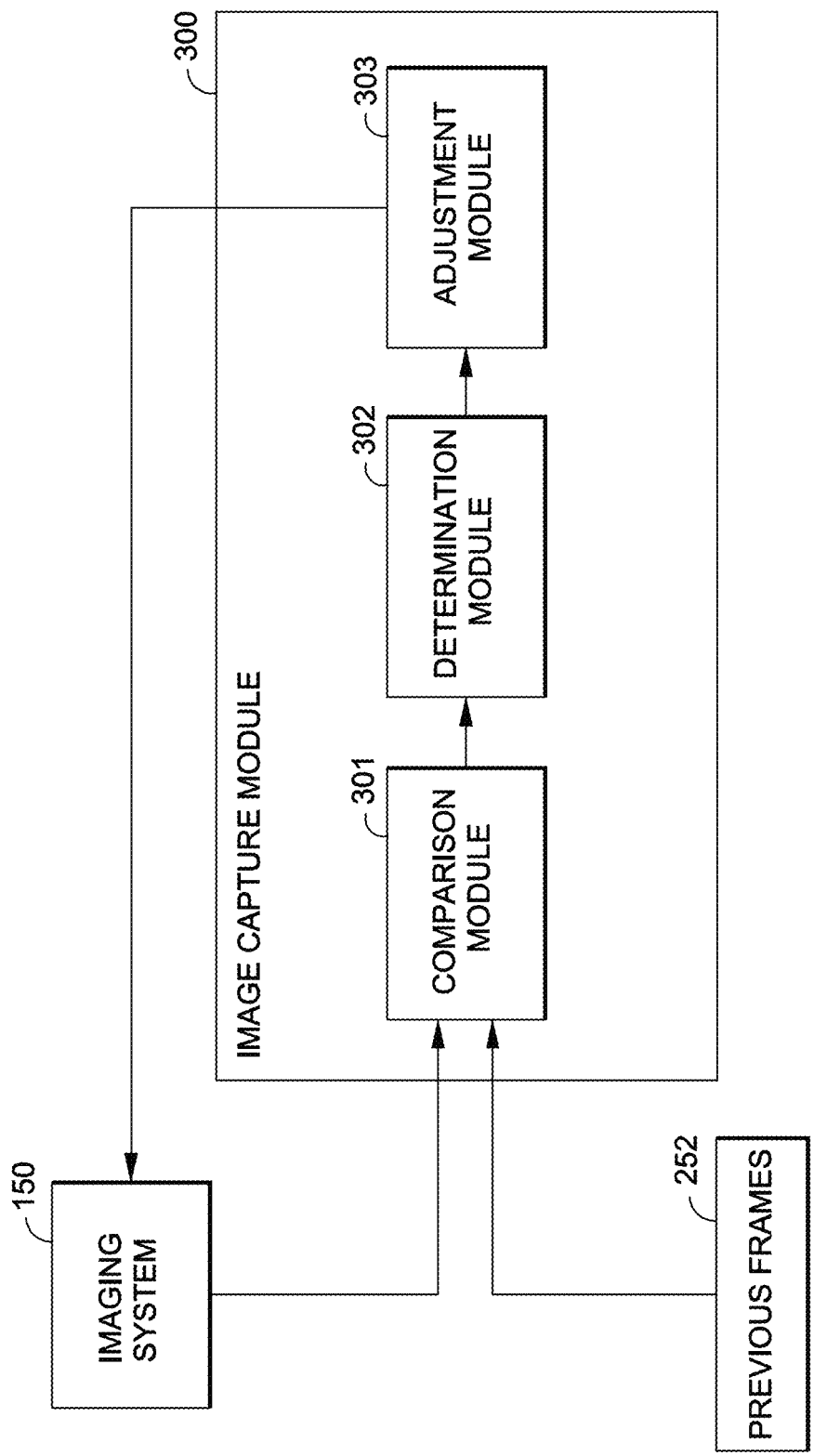
FIG. 3 is a view for explaining an image capture module according to one example embodiment.

FIG. 3 is a view for explaining an image capture module according to one example embodiment. As previously discussed with respect to FIG. 2B, image capture module 300 comprises computer-executable process steps stored on a non-transitory computer-readable storage medium, such as non-volatile memory 56. More or less modules may be used, and other architectures are possible.

As shown in FIG. 3, image capture module 300 at least comparison module 301 for comparing spectral content in a first region of a current frame to spectral content in a counterpart region in a previous frame. To that end, comparison module 301 communicates with imaging system 150 to obtain captured image data, and accesses previous frames 252. Comparison module 301 also communicates with determination module 302, which determines whether the spectral content has changed by more than a threshold value, based on the comparison of the spectral content in the first region and that of the counterpart region. Determination module 302 also communicates with adjustment module 303, which, responsive to a determination that the spectral content has changed by more than the threshold value, adjusts the spectral capture parameter for the first region based on the spectral content of the first region, and applies the adjusted spectral capture parameter to the imaging system 150 for capture of a successive frame. Thus, as shown in FIG. 3, adjustment module communicates with imaging system 150. Each of these processes will be described more fully below.

Figure 4:
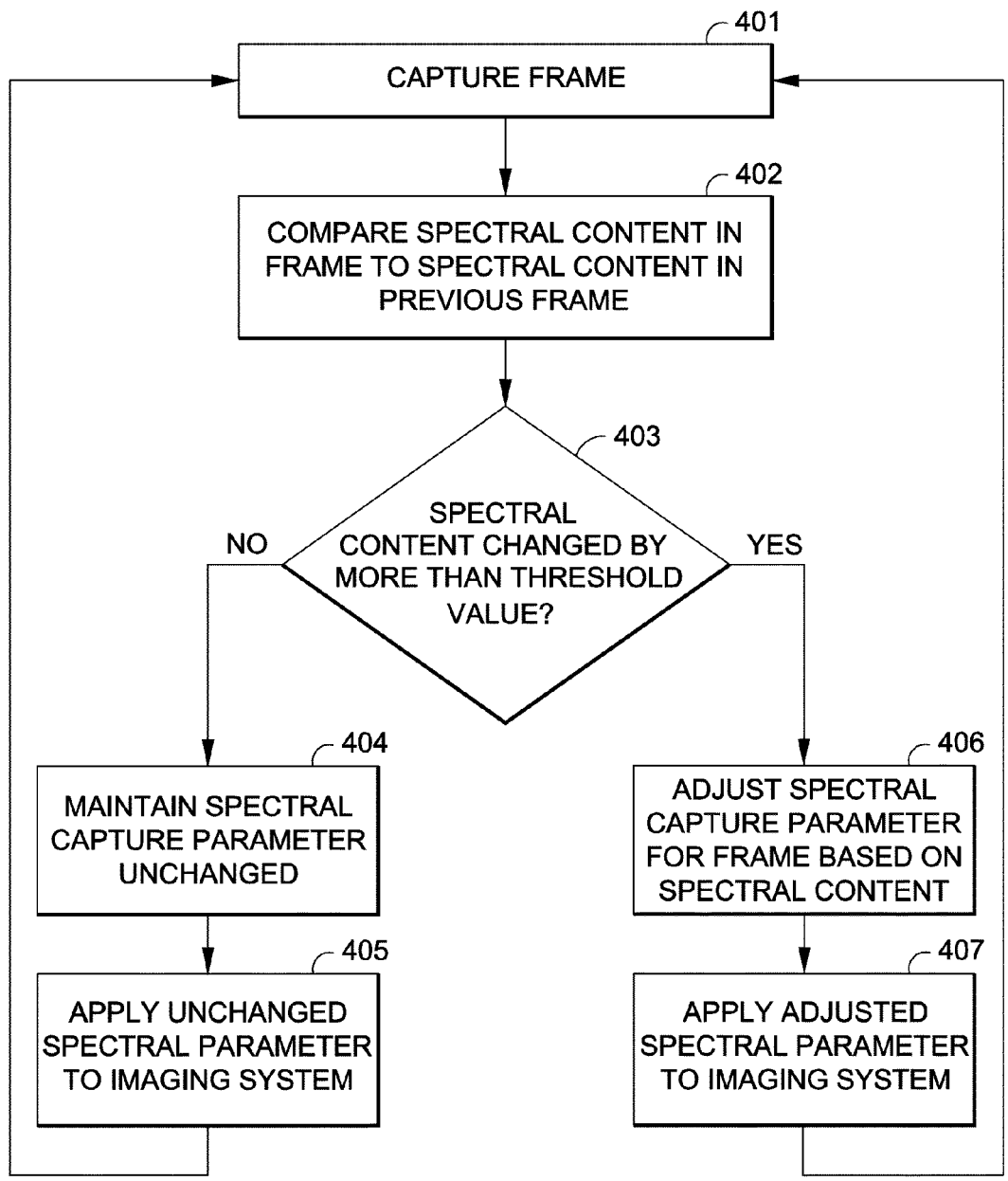
FIG. 4 is a flowchart for explaining processing in the image capture device shown in FIG. 1 according to an example embodiment.

FIG. 4 is a flow diagram for explaining processing in the image capture device shown in FIG. 1 according to an example embodiment.

Briefly, in FIG. 4, a spectral capture parameter is adjusted for capturing successive frames of motion image data in a spectral imaging system. The spectral imaging system has a spectral response tunable in accordance with a spectral capture parameter to capture multi-spectral or multi-channel image data, and includes an image sensor. Spectral content in a first region of a current frame is compared to spectral content in a counterpart region in a previous frame. Based on the comparison of the spectral content in the first region and that of the counterpart region, there is a determination of whether the spectral content has or has not changed by more than a threshold value related to the spectral error.

Responsive to a determination that the spectral content has changed by more than the spectral error threshold value, the spectral capture parameter for the first region is adjusted based on the spectral content of the first region, and the adjusted spectral capture parameter is applied to the imaging system for capture of a successive frame.

On the other hand, responsive to a determination that the spectral content has not changed by more than the threshold value, the spectral capture parameter is maintained unchanged from that for the counterpart region, and the unchanged spectral capture parameter is applied to the imaging system for capture of the successive frame. Put another way, in many of the blocks of the frame such as background, there might be no significant change in spectral content. As a consequence, it not ordinarily necessary to tune such blocks, and processing can be reduced.

In more detail, in step 401, a frame is captured by imaging system 150. In that regard, the frame may be captured as part of a series of frames comprising spectral video.

In step 402, the spectral content in the current frame is compared to the spectral content in a previous frame.

Figure 6:
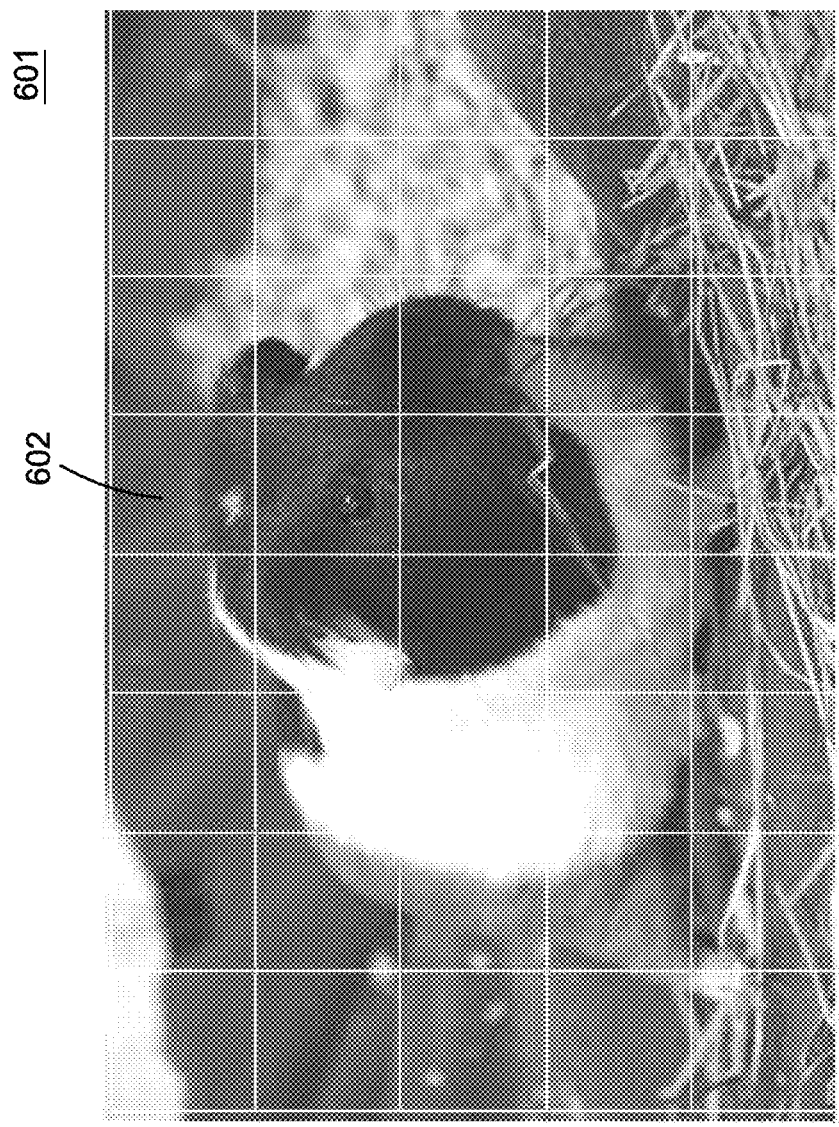
FIG. 6 is a view for explaining block processing in the image capture device shown in FIG. 1 according to an example embodiment.

In one example embodiment, so as to reduce necessary computations, each frame may be divided into blocks, as shown in FIG. 6. Moreover, the blocks may be combined into regions based on, e.g., analysis of a frame, and the regions may be adjusted based on characteristics of pixels in the block. Thus, the first region of the current frame and the counterpart region of the previous frame may be based on a regular block structure applied to respective ones of the frames. Then, between the previous frame and the current frame, there is a calculation of the difference in spectral content between the block in the current frame and the same block in the previous frame (e.g., block 602 of frame 601).

The comparison of spectral content may be performed in various ways. For example, calculating the root-mean-square (rms) error between the estimated reflectances within that block would be a simple way to compute the difference. Other techniques may also be used for this step, such as finding the mean deltaE, S-CIELAB, etc.

In step 403, there is a determination of whether the spectral content has changed by more than a threshold value between the current frame and the previous frame.

The threshold may depend significantly on the type of application, and/or on the type of scene. In one example, the threshold may correspond to a mathematical measure of the difference in spectral content based on, e.g., a root mean square (rms) error of the spectral values. Thus, for example, if the root mean square error of the rms values is greater than 20%, the nature of the object in the block may have changed (e.g., due to movement of objects or change in scenery) and the block may require tuning, whereas if the rms error is less than 20%, the discrepancy might be attributable to noise.

If the sum of the difference within the block is below this threshold, then this indicates that the specific block region has not changed substantially between the previous and current frame. Thus, the sensor (or system) pixels corresponding to this specific block region can use the same tuning voltages as the tuning voltages used in the current frame for the subsequent frame. Accordingly, the process proceeds to step 404.

In step 404, the spectral capture parameter is maintained unchanged, and in step 405, the unchanged spectral parameter is applied to the imaging system. The process then proceeds back to step 401 to capture the next frame.

On the other hand, if the difference exceeds the threshold, then it is likely that the specific block region has changed considerably between the previous and current frame. Thus, the sensor (or system) pixels corresponding to this specific block must be re-tuned according to the contents of the current frame. Thus, the process proceeds to step 406.

In step 406, upon the determination that the spectral content has changed by more than a threshold value, the spectral capture parameter for the current frame is adjusted based on spectral content.

Figure 8:
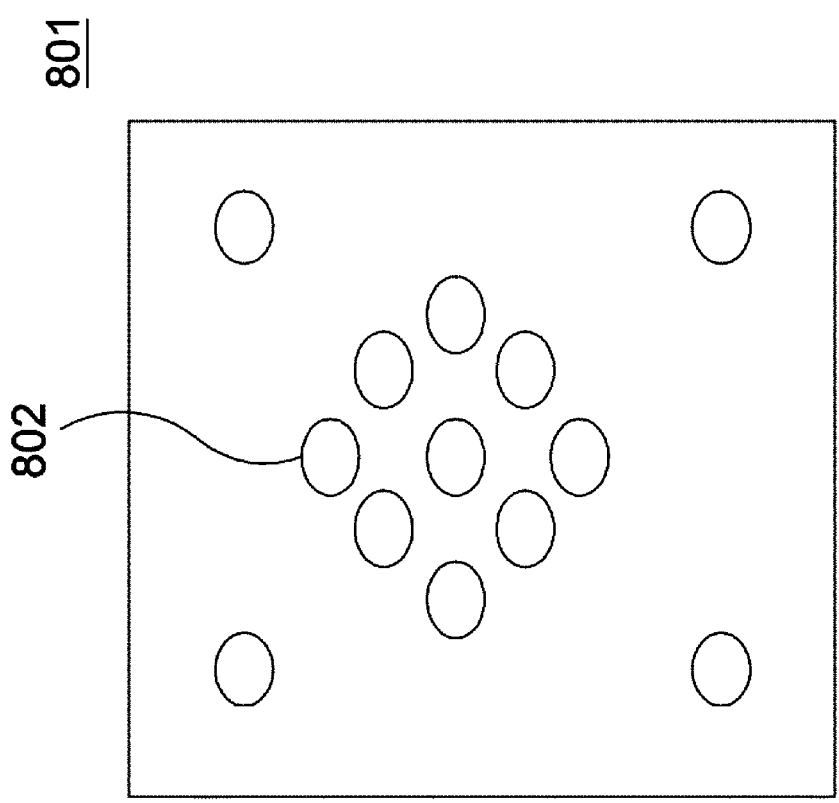
FIG. 8 is a view for explaining point-wise tuning in the image capture device shown in FIG. 1 according to an example embodiment.

In that regard, the tuning setting for a particular area of a block should generally work well for a large amount of pixels within the block, or even for a larger region of blocks. Accordingly, in one embodiment, a few points within a block which needs to be re-tuned may be sampled, as shown in, for example, FIG. 8. These sample pixels could correspond to points of importance in the block, such as the center and outside corners. Thus, in one example, a pair of sample pixels within each of the first region of a current frame and the counterpart region of a previous frame is identified, and the spectral content of the pair of sample pixels is compared.

Each one of the points is then sampled separately to choose a color filter mode for the block (and/or region). An example of choosing a color filter mode is described in U.S. Provisional Application No. 61/532,969, filed Sep. 9, 2011, entitled "Efficient Spectral Imaging Based On Imaging Systems With Scene Adaptation Using Tunable Color Pixels", by Andy Lai Lin, the contents of which are incorporated by reference herein. The filter mode corresponding to the most sampled points is then used as the color filter mode for the block/region. The filter modes may be stored in a look-up table, e.g., if the sample points correspond to mostly blue, use a filter mode having voltages to increase capture of blue and reduce the capture of red and green. The modes may be mapped to particular spectral data by, for example, machine learning calibration.

In another example, image capture apparatus 100 may have more memory or power for computation and a block-by-block tuning may not be necessary. In particular, it might be possible to tune each sampling point one-by-one, or even, with sufficient processing power, perform the processing according to FIG. 4 on a pixel-by-pixel basis. In still other examples, values of the sampling points in each block could be averaged, or a single sampling point could be chosen for each block, etc.

Once the tuning setting has been determined for the frame in step 406, the process proceeds to step 407 to apply the adjusted spectral parameter to the imaging system, as described above. The process then proceeds back to step 401 to capture the next frame.

Figure 5:
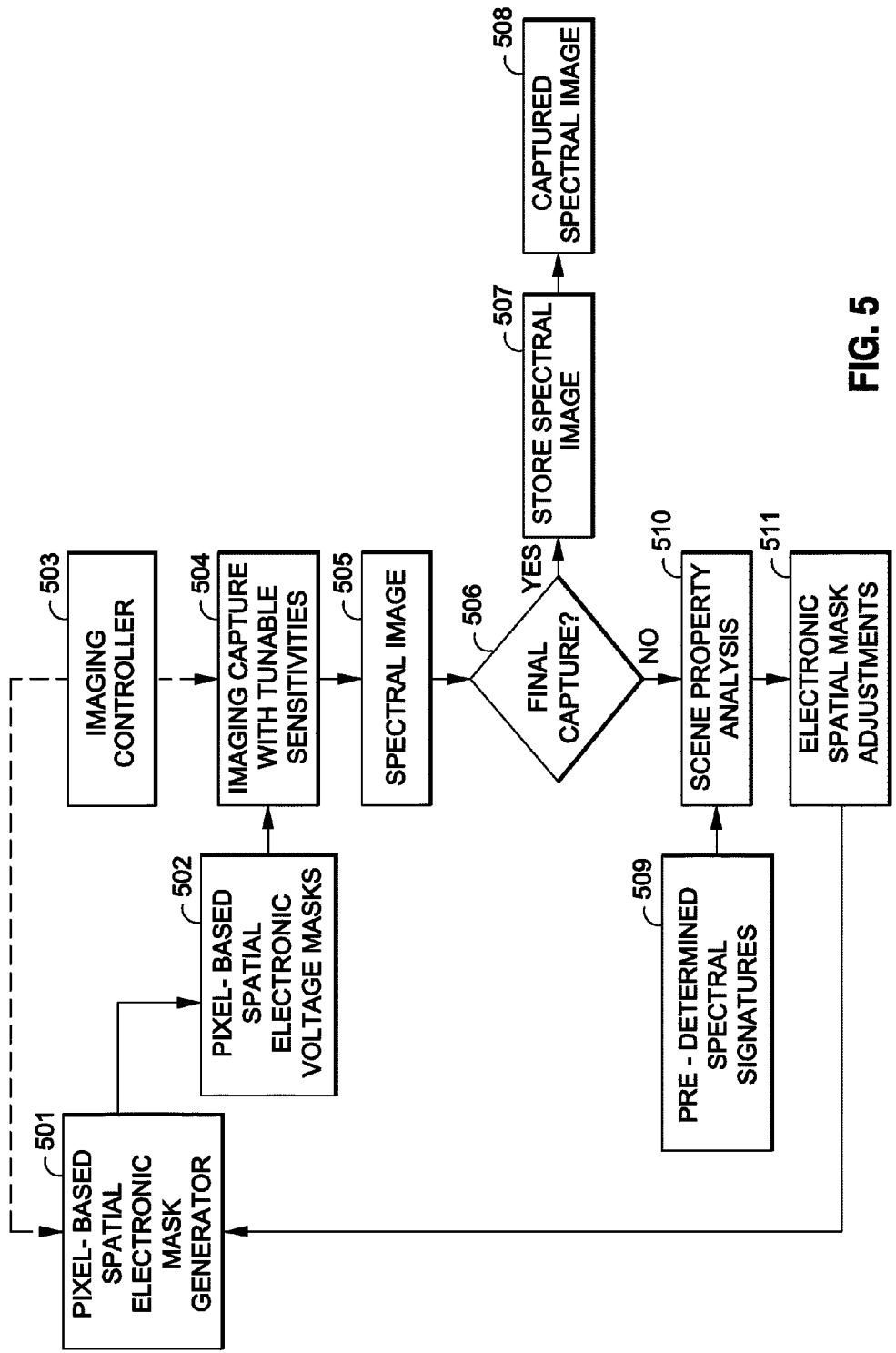
FIG. 5 is a flowchart for explaining processing in the image capture device shown in FIG. 1 according to another example embodiment.

FIG. 5 is a flowchart for explaining, in more detail, an adaptive spectral imaging capture using an imaging capturing system with tunable sensitivities considering a still image case. In particular, FIG. 5 is a flow diagram for explaining an example embodiment of an image capture of a scene in which spectral selectivity is adjusted on a pixel-by-pixel basis, or a region-by-region basis, for an imaging system with tunable spectral properties, so as to increase spectral differentiation for spectral content in the scene. In that regard, a more detailed explanation can be found in U.S. application Ser. No. 12/949,592, filed Nov. 18, 2010, entitled "Adaptive Spectral Imaging by Using an Imaging Assembly with Tunable Spectral Sensitivities", by Francisco Imai, as described above.

In step 501, voltage adjustments for each region are provided to the electronic mask generator for determination of a spatial mask. In step 502, the image controller sends a command to tune the imaging system in accordance with the spatial mask. Meanwhile, in step 503, an imaging controller controls a spatial electronic mask generator to set-up an initial state for a pixel-by-pixel basis spatial electronic voltage mask that is going to modulate the amplitude and spectral selectivity of an imaging system with tunable color sensitivities. The electronic mask can control amplitude and spectra tuning for each pixel. The initial state for the pixel-by-pixel basis spatial mask is given by electronic voltages that has some assumptions about illumination and material properties of the scene and is usually a pre-designated setting determined in advance such as by a calibration procedure that is made in the imaging system assembly line. The default capture parameter includes this initial state for the pixel-by-pixel basis spatial mask.

In steps 504 and 505, the image controller sends a command to tune the imaging system in accordance with the default capture parameter and capture a spectral image. For example, the default capture parameter corresponds to signals to produce an arrangement of pixels in the imaging system, such that the imaging system has color channels for, e.g., five different spectral sensitivities, and thus has a spectral dimensionality of five.

In step 506, there is a determination of whether the captured spectral image is the final image. For example, if the shutter is half-pressed, then it is determined that the shooting mode is an analysis mode, and if the shutter is full-pressed, then it is determined that the shooting mode is not the analysis mode. If the spectral image was captured in the analysis mode, then it is not the final image.

If it is determined the captured image is the final image ("YES" in step 506), then the captured spectral image is stored (step 507, as captured spectral image 508).

If it is determined that the captured image is not the final image ("NO" in step 509), then processing proceeds to step 510. In step 510, the captured spectral image is analyzed, which may include reference to pre-determined spectral signatures 509. In particular, the digital signal for each channel in each pixel is analyzed to determine the spectral signature for each pixel.

In one example, contiguous pixels with similar spectral signatures are clustered into regions of the captured scene, wherein each such region shares similar spectral content that is dissimilar from spectral content in other regions of the scene.

For each region, new spectral bands are determined so as to increase spectral differentiation for spectral content in the region. For example, for a region with an dark blue spectral signature, there is not much additional information captured by acquiring the Green-Yellow and Red channels. Therefore, the imaging capturing system with tunable sensitivities is adjusted for the dark blue spectral signature region to increase the sensitivities for the Blue, Blue-Green and Green channels, and by doing so, it is possible to obtain more meaningful spectral selection and to increase signal-to-noise ratio.

In step 511, a spectral mask is constructed for application to the imaging system. The spectral mask is constructed by using the weight values determined for each of the multiple different regions. In particular, each weight value is converted into a corresponding voltage adjustment to be applied to the pixel-by-pixel basis spatial electronic voltage mask. In one example embodiment, the weight values are converted into voltage adjustments by using a pre-calculated LUT which maps weight values to voltage adjustments. In other embodiments, the weight values are converted into voltage adjustments by applying a transformation which transforms weight values to voltage adjustments.

Turning to step 506, it is determined whether the captured spectral image is the final image, and if so, ("YES" in step 506), then the captured spectral image is stored (in step 507, as captured spectral image 508).

Figure 7:
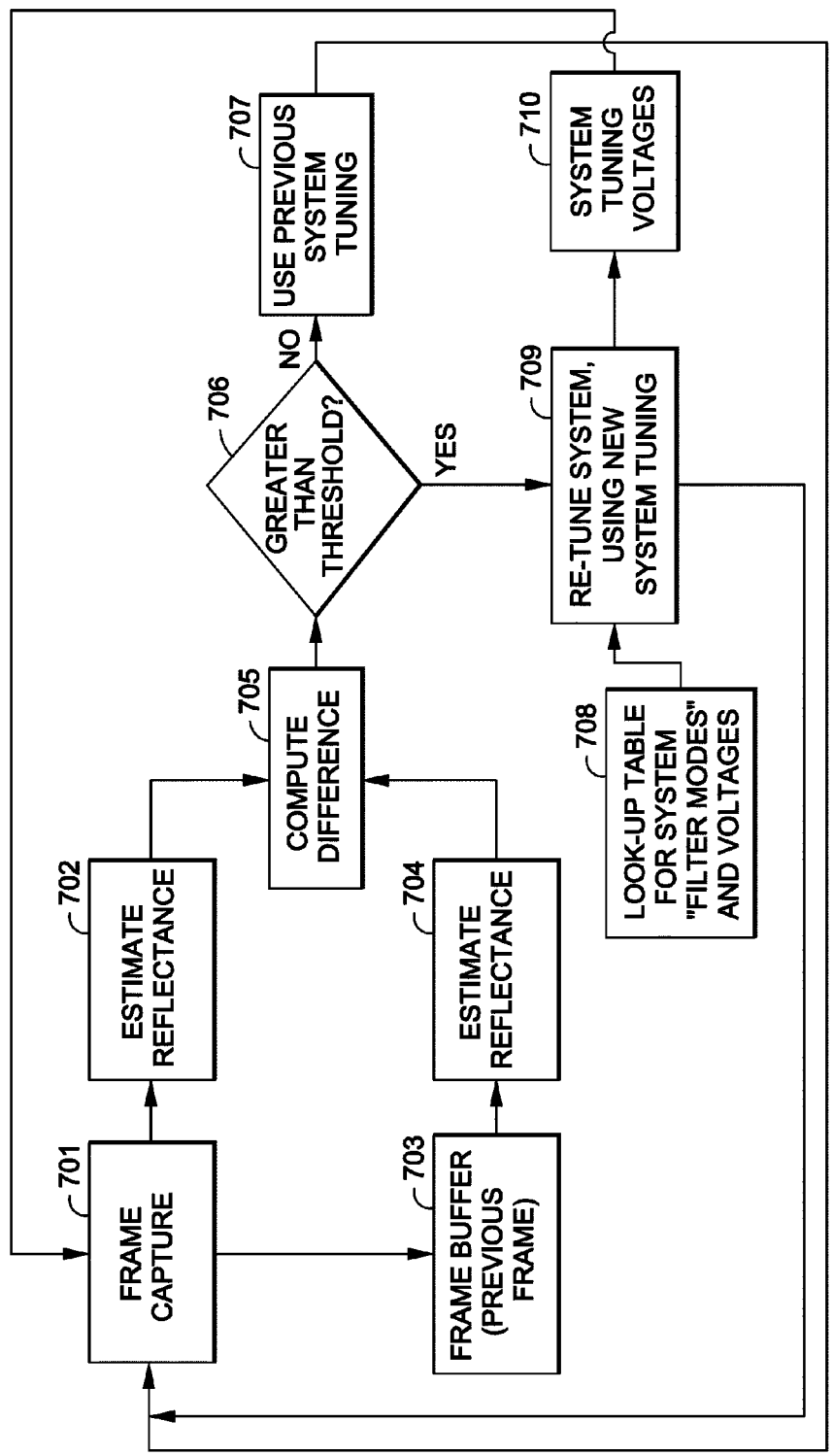
FIG. 7 is a flowchart for explaining processing in the image capture device shown in FIG. 1 according to another example embodiment.

FIG. 7 is another flowchart for explaining processing in the image capture device shown in FIG. 1 according to an example embodiment. This processing may be performed for every block-based region separately, and corresponds generally to the process described in FIG. 4.

In step 701, a frame is captured, and in step 702 the reflectance of the frame is estimated, as described above with respect to FIG. 4. Meanwhile, a frame buffer (e.g., previous frames 252) is accessed to obtain a previous frame in step 703, and the reflectance of the previous frame is estimated in step 704. The difference between the reflectances is computed in step 705. In step 706, it is determined whether the difference is greater than a threshold. If not, in step 707, the previous system tuning is used, and the process proceeds back to step 701 to capture the next frame. Meanwhile, if the difference in spectral reflectance between the previous frame and the captured frame does exceed the threshold, the system is re-tuned in step 708, using, for example, a look up table which lists system "filter modes" and corresponding voltages in step 709. The output system tuning voltages 710 are input to step 701 for capture of the next frame.

Figure 9:
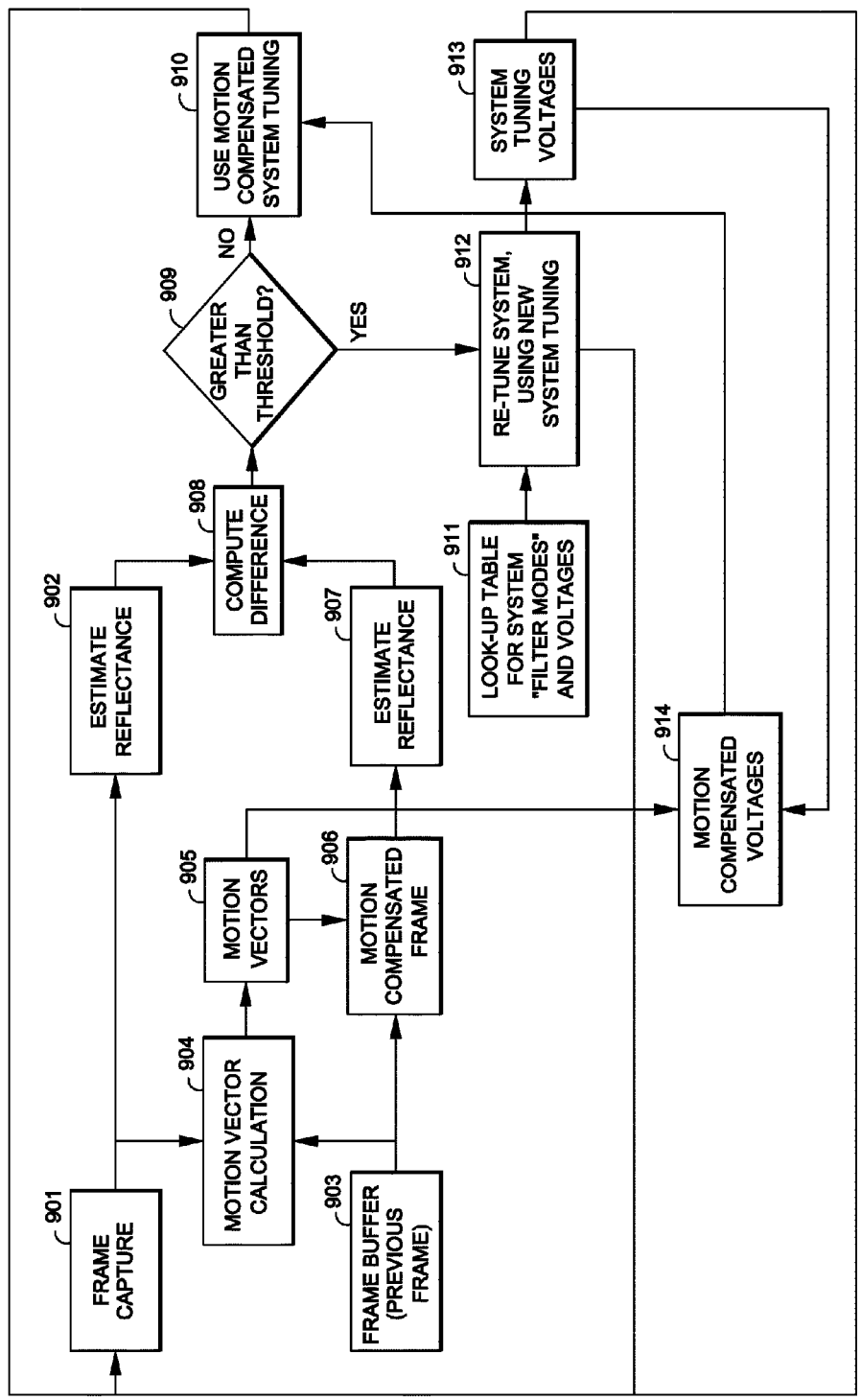
FIG. 9 is a flowchart for explaining processing in the image capture device shown in FIG. 1 according to yet another example embodiment.

FIG. 9 is a flowchart for explaining another example embodiment, which takes motion estimation into account when tuning the image system. In that regard, in video capture, in addition to objects in the scene moving the video camera itself may also be moving, and thus these motions must be compensated for. For example, many videos are shot with moving cameras, panning cameras, hand-held cameras, and the like. The idea of motion estimation is used in video compression, and aims to model the movement between frames for blocks or regions of the video at a time.

For example, a current region of the image may be modeled as a 2-D movement of another region from the previous frame. In that regard, there are several types of motion-estimation procedures. Some motion-estimation procedures include direct block-matching (matching blocks throughout multiple frames and detecting redundancies over time) and the Lucas-Kanade optical flow procedure (based on assumption that objects in the neighborhood of a pixel move in the same direction).

Motion compensation can be performed on a block-by-block or region-by-region basis, ordinarily reducing the computation needed for these procedures. For example, image analysis could be performed from time to time to determine foreground and background of a scene, in order to assume regions of blocks corresponding to each (which can then be tuned together). As above, sampling within a block can be used to apply to the block or to a region of blocks. In accordance with this embodiment, a motion estimation procedure can be used to model the movements of blocks or regions from the previous frame to the current frame and a subsequent frame.

In particular, a motion vector from one or more of the motion estimation procedures can be used to describe in which direction certain pixels are moving. To save computation, the motion vector may not be calculated for each pixel of a block, but rather for, e.g., one pixel per block. Using the motion vectors, it is possible to predict whether an object has changed position, for example due to motion of the object in the scene or motion of the camera itself. Thus, motion is estimated between a previous frame and a current frame, and a location of the first region in a successive frame is predicted based on location of the counterpart region in the previous frame and based on the motion estimation.

In this example, therefore, the same motion vector calculated for the previous and current frame is used to estimate or predict apparent motion of blocks or regions in the subsequent frame. In other words, it is assumed that motion vectors do not change substantially between subsequent frames. An example of such motion prediction can be seen in FIG. 10.

Once the motion has been compensated for (estimated), the reflectance for the block or region can be estimated, and tuning parameters can be computed as discussed above. The tuning is then applied to the proper block or region of the frame based on the motion estimation by, if needed, tuning a subsequent frame along that motion vector. Thus, in this embodiment, the region or block in the current frame is projected to a new location using the calculated motion vector. For example, the re-tuned pixels are reprojected onto a subsequent frame, using the motion estimation. Thus, the estimated motion is taken into consideration by adjusting the spectral capture parameter at the predicted location of the first region of a current frame in a case where the estimated motion exceeds a motion threshold. In that regard, in one example, the motion estimation predicts the location of the first region in the successive frame based on movement of the counterpart region and movement of the image capture apparatus.

Returning to FIG. 9, in step 901, a frame is captured. The frame is input to step 904 for motion vector calculation, while also being input to step 902 for estimation of spectral reflectance as described above with respect to FIG. 4.

Meanwhile, in step 903, a previous frame is accessed from a frame buffer such as previous frames 252, and is input to step 904 for motion vector calculation. In step 904, motion vectors are calculated, and in step 905, motion vectors are output to step 906 as a motion compensated frame.

In that regard, a motion threshold may be used to determine whether the object or region needs to be projected into the future (and thus whether a corresponding area in from the motion estimation must be tuned in the subsequent frame based on the calculated tuning parameters). For example, if motion estimation indicates that an object is not moving significantly, there is little need to "jump ahead" motion-wise to tune the same object in the subsequent frame.

In step 907, the spectral reflectance of the motion compensated frame is estimated, and in step 908, the spectral content in the current frame is compared to the spectral content in the motion compensated frame, in a manner similar to that described above with respect to FIG. 4.

If it is determined in step 909 that the difference in spectral content does not exceed the threshold (see FIG. 4), the parameters for tuning remain the same, but the system tuning is nonetheless motion-compensated in step 910. Thus, although spectral parameters for a block or region may be maintained, those old parameters still need to be applied to the correct location of the moving block or frame in the next capture.

On the other hand, if it is determined in step 909 that if the difference in spectral content exceeds the threshold, a look-up table for system filter modes and voltages is accessed in step 911 and the system is re-tuned in step 912, using the new system turning. The system tuning voltages are output in step 913 and combined with motion vectors from step 905 to form motion-compensated voltages, which are then used to perform motion-compensated system tuning in step 901 for the next frame capture.

FIG. 11 is a view for explaining high residual correction according to yet another example embodiment.

In particular, when parts of a block are moving and others are stationary, there will be discrepancy of movement within the block. An example of this is when there is a moving object against a stationary background. An example of this is shown in FIG. 11. As seen in FIG. 11, from previous frame 1101 to current frame 1106 and future frame 1111, circle 1102 moves to positions 1107 and 1112, respectively, and box 1103 moves to positions 1108 and 1113, respectively. On the other hand, star 1105 remains stationary, i.e., at the same corresponding positions 1110 and 1114.

To adjust for this discrepancy in movement within the block, there is first a calculation of the residual between the motion compensated block from the previous frame, and the correct block, on a pixel-wise basis. In that regard, "residual" refers to the amount of discrepancy between the estimated motion of a block and the actual motion of the block as subsequently observed. Portions of a frame that exhibit a high residual may be calculated by determining whether the residual exceeds a threshold or not.

In one method, if the residual motion exceeds a threshold, there is a determination to retune those high-residual pixels, but the retuning may be performed using the default filter mode for these portions of the block from the future frame. Put another way, if the residual exceeds a predetermined threshold, a future frame is re-tuned based on the original motion-projected areas of the current frame. This method may require relatively little calculation, and thus reduce or minimize latency in the system.

In another method, portions that exhibit high residual may be re-tuned while estimating the motion of both the stationary objects and the moving objects, and then re-tuning both based on current pixels values for both objects. In that regard, the area of high residual must be "moved" correspondingly to the movement of the predicted motion vector of the current block. This method is relatively more aggressive, and may be more accurate, but may also induce more latency in certain systems.

Turning to FIG. 12, FIG. 12 is a flowchart for explaining high residual correction according to an example embodiment.

In step 1201, motion compensation is performed for a block as described above.

In step 1202, the residual within portions of the block is calculated, by calculating on a pixel-wise basis the residual (difference) between the motion compensated block from the previous frame, and the block at its actual location.

In step 1203, there is a determination on a pixel-wise basis whether there exist portions of the block with high residual. It not, the process proceeds to step 1204 to simply use the tuning parameters from the previous frame (reprojected from the motion compensation). If so, the process proceeds to step 1205 to re-tune the portions that exhibit high residual according to one of the methods described above.

Thus, when parts of a block are moving and other parts are stationary, there is a calculation of the residual between a block of a current frame and the motion compensated block from the previous frame. If the residual exceeds a predetermined threshold, a future frame is re-tuned based on the original motion-projected regions of the current frame, or the future frame is retuned based on a pixel from the current frame.

According to still another example embodiment, an intra-coded refresh frame may be adopted to reset system tuning parameters after an extended period of time. In that regard, there may be small changes in the scene in illumination and sensor noise, such that the continued use of motion-compensated system tuning parameters might be slightly inaccurate from frame to frame. These inaccuracies can add up throughout a large number of frames, such that the system turning parameters are significantly inaccurate or inappropriate after an extended period of time.

For this reason, after a set number of frames, this embodiment forces the entire frame to re-tune system parameters, based only on the current frame. Put another way, instead of re-using tuning parameters from the previous frame, all tuning parameters are calculated from scratch using the current frame. Thus, after a predetermined number of frames have been captured, a refresh frame is calculated in which the tuning parameters for the frame are re-tuned based only on data captured in the refresh frame. In this regard, motion compensation can still be performed, such that the "refreshed" parameters are applied to the current blocks in the future frame.

Thus, in this embodiment, encoding of the successive frames of motion image data uses mixed encodings comprised of interframe encoding and intraframe encoding, and for an intraframe encoded frame, a pixel-by-pixel sampling of spectral content for an entirety of the frame is used to calculate the spectral capture parameter for such frame.

In yet another example embodiment, system tuning is performed for high dynamic range (HDR) video capture. In particular, in HDR images, there may be a large range of luminance, e.g., very bright and very dark areas. Conventional cameras are not very accurate at adapting to these areas, particularly if they change, and the result can be saturated or very dark areas of frames.

Accordingly, according to this example embodiment, an additional biasing term is added to the system tuning voltage, to adjust the height of spectral sensitivity curves. Curves which are higher capture darker regions better, whereas curves that are lower capture brighter regions better, as indicated from curves 1301, 1302, and 1303 in FIG. 13. Put another way, high biasing is used in dark regions, whereas low biasing is used in bright regions. Thus, the biasing term added to the system tuning voltage is related to the brightness of the pixel. The biasing term may correspond to an amount of change needed to shift the spectral curve, such as a factor to multiple, or a value based on a lookup table (for this type of luminance, use this biasing term). Another look-up table can be used later to translate the biasing term to system voltages.

FIG. 14 is a view for explaining biasing vector re-projection. Assuming that the biasing term has been calculated for a current and previous frame (by simple comparison between the frames or otherwise), the difference is the biasing terms between the previous and current motion-compensated pixels is calculated, and the biasing term is applied to a successive frame along with repositioning using the motion vectors of the current frame. Thus, both the biasing difference and motion are projected into the next frame. This can be done on a pixel-by-pixel basis.

The concept of adjusting biasing term can therefore be considered as analogous to the motion vector case, except that instead of calculating a motion vector, a "change in biasing term" vector is obtained and re-applied to the successive frame. The "biasing vector" concept takes into consideration that there are gentle gradients in illumination in the real world. If an object is moving, and consequently becoming brighter by moving closer to an illuminant, it is more likely that it will continue to become brighter. While this assumption is not always true, it can be most of the time.

FIG. 15 is a flow diagram for explaining the biasing vector re-projection shown in FIG. 14. In particular, both the current biasing voltage 1501 and previous biasing voltage 1502 are input to create biasing vector 1503, which is then used to calculate a new biasing voltage 1504 for the future frame by projecting the current biasing voltage 1501 and the biasing vector 1503. Thus, a change in brightness between the previous frame and the current frame is estimated, and a biasing term for adjusting the spectral capture parameter is calculated to compensate for the change in brightness in the first region in a successive frame.

Thus, in one embodiment, both a spectral capture parameter and a biasing term are adjusted for capturing successive frames of motion image data in a spectral imaging system. The spectral imaging system has a spectral response tunable in accordance with a spectral capture parameter to capture multi-spectral or multi-channel image data, and includes an image sensor. Spectral content in a first region of a current frame is compared to spectral content in a counterpart region in a previous frame. Based on the comparison of the spectral content in the first region and that of the counterpart region, there is a determination of whether the spectral content has or has not changed by more than a threshold value related to the spectral error. Responsive to a determination that the spectral content has changed by more than the spectral error threshold value, the spectral capture parameter for the first region is adjusted based on the spectral content of the first region, and the adjusted spectral capture parameter is applied to the imaging system for capture of a successive frame. In addition, a change in brightness between the previous frame and the current frame is estimated, and a biasing term for adjusting the spectral capture parameter is calculated to compensate for the change in brightness in the first region in the successive frame. For example, a difference is the biasing terms between the previous and current motion-compensated pixels is calculated, and the biasing term is applied to the successive frame.

By virtue of the above arrangements, it is ordinarily possible to achieve spectral video which performs better with higher efficiency. For example, by only performing re-tuning for blocks of an image whose spectral content has changed significantly, it is possible to significantly reduce computation. By estimating motion and/or lighting change, it is ordinarily possible to have a more accurate tuning as these factors change.

Other Embodiments

According to other embodiments contemplated by the present disclosure, example embodiments may include a computer processor such as a single core or multi-core central processing unit (CPU) or micro-processing unit (MPU), which is constructed to realize the functionality described above. The computer processor might be incorporated in a stand-alone apparatus or in a multi-component apparatus, or might comprise multiple computer processors which are constructed to work together to realize such functionality. The computer processor or processors execute a computer-executable program (sometimes referred to as computer-executable instructions or computer-executable code) to perform some or all of the above-described functions. The computer-executable program may be pre-stored in the computer processor(s), or the computer processor(s) may be functionally connected for access to a non-transitory computer-readable storage medium on which the computer-executable program or program steps are stored. For these purposes, access to the non-transitory computer-readable storage medium may be a local access such as by access via a local memory bus structure, or may be a remote access such as by access via a wired or wireless network or Internet. The computer processor(s) may thereafter be operated to execute the computer-executable program or program steps to perform functions of the above-described embodiments.

According to still further embodiments contemplated by the present disclosure, example embodiments may include methods in which the functionality described above is performed by a computer processor such as a single core or multi-core central processing unit (CPU) or micro-processing unit (MPU). As explained above, the computer processor might be incorporated in a stand-alone apparatus or in a multi-component apparatus, or might comprise multiple computer processors which work together to perform such functionality. The computer processor or processors execute a computer-executable program (sometimes referred to as computer-executable instructions or computer-executable code) to perform some or all of the above-described functions. The computer-executable program may be pre-stored in the computer processor(s), or the computer processor(s) may be functionally connected for access to a non-transitory computer-readable storage medium on which the computer-executable program or program steps are stored. Access to the non-transitory computer-readable storage medium may form part of the method of the embodiment. For these purposes, access to the non-transitory computer-readable storage medium may be a local access such as by access via a local memory bus structure, or may be a remote access such as by access via a wired or wireless network or Internet. The computer processor(s) is/are thereafter operated to execute the computer-executable program or program steps to perform functions of the above-described embodiments.

The non-transitory computer-readable storage medium on which a computer-executable program or program steps are stored may be any of a wide variety of tangible storage devices which are constructed to retrievably store data, including, for example, any of a flexible disk (floppy disk), a hard disk, an optical disk, a magneto-optical disk, a compact disc (CD), a digital versatile disc (DVD), micro-drive, a read only memory (ROM), random access memory (RAM), erasable programmable read only memory (EPROM), electrically erasable programmable read only memory (EEPROM), dynamic random access memory (DRAM), video RAM (VRAM), a magnetic tape or card, optical card, nanosystem, molecular memory integrated circuit, redundant array of independent disks (RAID), a nonvolatile memory card, a flash memory device, a storage of distributed computing systems and the like. The storage medium may be a function expansion unit removably inserted in and/or remotely accessed by the apparatus or system for use with the computer processor(s).

This disclosure has provided a detailed description with respect to particular representative embodiments. It is understood that the scope of the appended claims is not limited to the above-described embodiments and that various changes and modifications may be made without departing from the scope of the claims.

What is claimed is:

1. In an image capture apparatus having a spectral imaging system which has a spectral response tunable in accordance with a spectral capture parameter to capture multi-spectral or multi-channel image data, and which includes an image sensor, a method for adjusting the spectral capture parameter for capturing successive frames of motion image data, the method comprising:
generating the spectral content of the captured data by multispectral data measurements or estimation from multi-channel image data;
comparing spectral content in a first region of a current frame to spectral content in a counterpart region in a previous frame having a same relative position as the first region;
determining whether the spectral content has changed by more than a threshold value, based on the comparison of the spectral content in the first region and that of the counterpart region;
responsive to a determination that the spectral content has changed by more than the threshold value, adjusting the spectral capture parameter for the first region based on the spectral content of the first region, and applying the adjusted spectral capture parameter to the imaging system for capture of a successive frame.

2. The method according to claim 1, wherein responsive to a determination that the spectral content has not changed by more than the threshold value, the spectral capture parameter is maintained unchanged from that for the counterpart region, and the unchanged spectral capture parameter is applied to the imaging system for capture of the successive frame.

3. The method of claim 1, wherein the comparing step comprises identifying a pair of sample pixels within each of the first region and the counterpart region, and comparing the spectral content of the pair of sample pixels.

4. The method of claim 1, wherein the first region and the counterpart region are based on a regular block structure applied to respective ones of the frames.

5. The method of claim 1, further comprising estimating motion between the previous frame and the current frame, and predicting a location of the first region in a successive frame based on location of the counterpart region in the previous frame and based on the motion estimation.

6. The method according to claim 5, further comprising taking the estimated motion into consideration by adjusting the spectral capture parameter at the predicted location of the first region in a case where the estimated motion exceeds a motion threshold.

7. The method according to claim 5, wherein the motion estimation predicts the location of the first region based on movement of the counterpart region and movement of the image capture apparatus.

8. The method according to claim 5, wherein when parts of a block are moving and other parts are stationary, there is a calculation of the residual between a block of the current frame and the motion compensated block from the previous frame, and if the residual exceeds a predetermined threshold, a future frame is re-tuned based on the original motion-projected regions of the current frame, or the future frame is retuned based on a pixel from the current frame.

9. The method according to claim 1, further comprising encoding of the successive frames of motion image data using mixed encodings comprised of interframe encoding and intraframe encoding, wherein for an intraframe encoded frame, a pixel-by-pixel sampling of spectral content for an entirety of the frame is used to calculate the spectral capture parameter for such frame.

10. The method according to claim 1, wherein after a predetermined number of frames have been captured, a refresh frame is calculated in which the tuning parameters for the frame are re-tuned based only on data captured in the refresh frame.

11. The method according to claim 1, further comprising estimating a change in brightness between the previous frame and the current frame, and calculating a biasing term for adjusting the spectral capture parameter for the first region in a successive frame to compensate for the change in brightness.

12. An image capture apparatus having a spectral imaging system which has a spectral response tunable in accordance with a spectral capture parameter to capture multi-spectral or multi-channel image data, and which includes an image sensor, in which the spectral capture parameter is adjusted for capturing successive frames of motion image data, comprising:
   a computer-readable memory constructed to store computer-executable process steps; and
   a processor constructed to execute the computer-executable process steps stored in the memory;
   wherein the process steps stored in the memory cause the processor to:
   generate spectral content from multi-spectral or multi-channel image data;
   compare spectral content in a first region of a current frame to spectral content in a counterpart region in a previous frame having a same relative position as the first region;
   determine whether the spectral content has changed by more than a threshold value, based on the comparison of the spectral content in the first region and that of the counterpart region;
   responsive to a determination that the spectral content has changed by more than the threshold value, adjust the spectral capture parameter for the first region based on the spectral content of the first region, and apply the adjusted spectral capture parameter to the imaging system for capture of a successive frame.

13. The apparatus according to claim 12, wherein responsive to a determination that the spectral content has not changed by more than the threshold value, the spectral capture parameter is maintained unchanged from that for the counterpart region, and the unchanged spectral capture parameter is applied to the imaging system for capture of the successive frame.

14. The apparatus according to claim 12, wherein the comparing comprises identifying a pair of sample pixels within each of the first region and the counterpart region, and comparing the spectral content of the pair of sample pixels.

15. The apparatus according to claim 12, wherein the first region and the counterpart region are based on a regular block structure applied to respective ones of the frames.

16. The apparatus according to claim 12, wherein the process steps further cause the processor to estimate motion between the previous frame and the current frame, and to predict a location of the first region in a successive frame based on location of the counterpart region in the previous frame and based on the motion estimation.

17. The apparatus according to claim 16, wherein the process steps further cause the processor to take the estimated motion into consideration by adjusting the spectral capture parameter at the predicted location of the first region in a case where the estimated motion exceeds a motion threshold.

18. The apparatus according to claim 16, wherein the motion estimation predicts the location of the first region based on movement of the counterpart region and movement of the image capture apparatus.

19. The apparatus according to claim 16, wherein when parts of a block are moving and other parts are stationary, there is a calculation of the residual between a block of the current frame and the motion compensated block from the previous frame, and wherein if the residual exceeds a predetermined threshold, a future frame is re-tuned based on the original motion-projected regions of the current frame, or the future frame is retuned based on a pixel from the current frame.

20. The apparatus according to claim 12, wherein the process steps further cause the processor to encode the successive frames of motion image data using mixed encodings comprised of interframe encoding and intraframe encoding, wherein for an intraframe encoded frame, a pixel-by-pixel sampling of spectral content for an entirety of the frame is used to calculate the spectral capture parameter for such frame.

21. The apparatus according to claim 12, wherein after a predetermined number of frames have been captured, a refresh frame is calculated in which the tuning parameters for the frame are re-tuned based only on data captured in the refresh frame.

22. The apparatus according to claim 12, wherein the process steps further cause the processor to estimate a change in brightness between the previous frame and the current frame, and to calculate a biasing term for adjusting the spectral capture parameter for the first region in a successive frame to compensate for the change in brightness.

23. A non-transitory computer-readable storage medium on which is stored computer-executable process steps for causing, in an image capture apparatus having a spectral imaging system which has a spectral response tunable in accordance with a spectral capture parameter to capture multi-spectral image data, and which includes an image sensor, a computer to perform a method for adjusting the spectral capture parameter for capturing successive frames of motion image data, the method comprising:
   generating spectral content from multi-spectral or multi-channel images;

comparing spectral content in a first region of a current frame to spectral content in a counterpart region in a previous frame having a same relative position as the first region;

determining whether the spectral content has changed by more than a threshold value, based on the comparison of the spectral content in the first region and that of the counterpart region;

responsive to a determination that the spectral content has changed by more than the threshold value, adjusting the spectral capture parameter for the first region based on the spectral content of the first region, and applying the adjusted spectral capture parameter to the imaging system for capture of a successive frame.

* * * * *